(12) United States Patent
Hoshino et al.

(10) Patent No.: US 6,523,754 B2
(45) Date of Patent: Feb. 25, 2003

(54) IC CARD, A METHOD OF CONTROLLING UPDATE OF DATA, A METHOD OF CONTROLLING RESTORATION OF DATA OR MESSAGES, AND A COMPUTER PRODUCT

(75) Inventors: Masao Hoshino, Kawasaki (JP); Tomomi Shiobara, Kawasaki (JP); Yuji Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/789,752

(22) Filed: Feb. 22, 2001

(65) Prior Publication Data

US 2002/0043565 A1 Apr. 18, 2002

(30) Foreign Application Priority Data

Oct. 17, 2000 (JP) .......................................... 2000-317099

(51) Int. Cl.$^7$ .............................................. G06K 19/06
(52) U.S. Cl. ........................ 235/492; 235/487; 235/437
(58) Field of Search ................................. 235/492, 487, 235/376, 437; 711/101, 117, 144, 145, 156, 173

(56) References Cited

U.S. PATENT DOCUMENTS

| | | | | | |
|---|---|---|---|---|---|
| 4,797,543 A | * | 1/1989 | Watanabe | .................... | 235/492 |
| 4,887,234 A | * | 12/1989 | Iijima | .......................... | 235/380 |
| 5,367,150 A | * | 11/1994 | Kitta et al. | ................... | 235/380 |
| 5,528,755 A | * | 6/1996 | Beardsley et al. | ...... | 395/185.01 |
| 5,835,955 A | * | 11/1998 | Dornier et al. | ............. | 711/162 |

* cited by examiner

Primary Examiner—Thien M. Le
Assistant Examiner—Daniel St. Cyr
(74) Attorney, Agent, or Firm—Armstrong Westerman & Hattori

(57) ABSTRACT

The IC card sets a status bit, to which an update command including write data is allotted, at a processing start state if receiving the update command from a host apparatus, updates a data region based on control information including information on a previous control region, sets the status bit at a processing end state, and finally transmits a response message to the host apparatus. When restarted if an update processing was interrupted, the IC card prohibits a write data update processing and transmits an error signal to the host apparatus if the status bit is set at the processing start state, and completes the update processing and then transmits the response message to the host apparatus if the status bit is set at the processing end state.

15 Claims, 12 Drawing Sheets

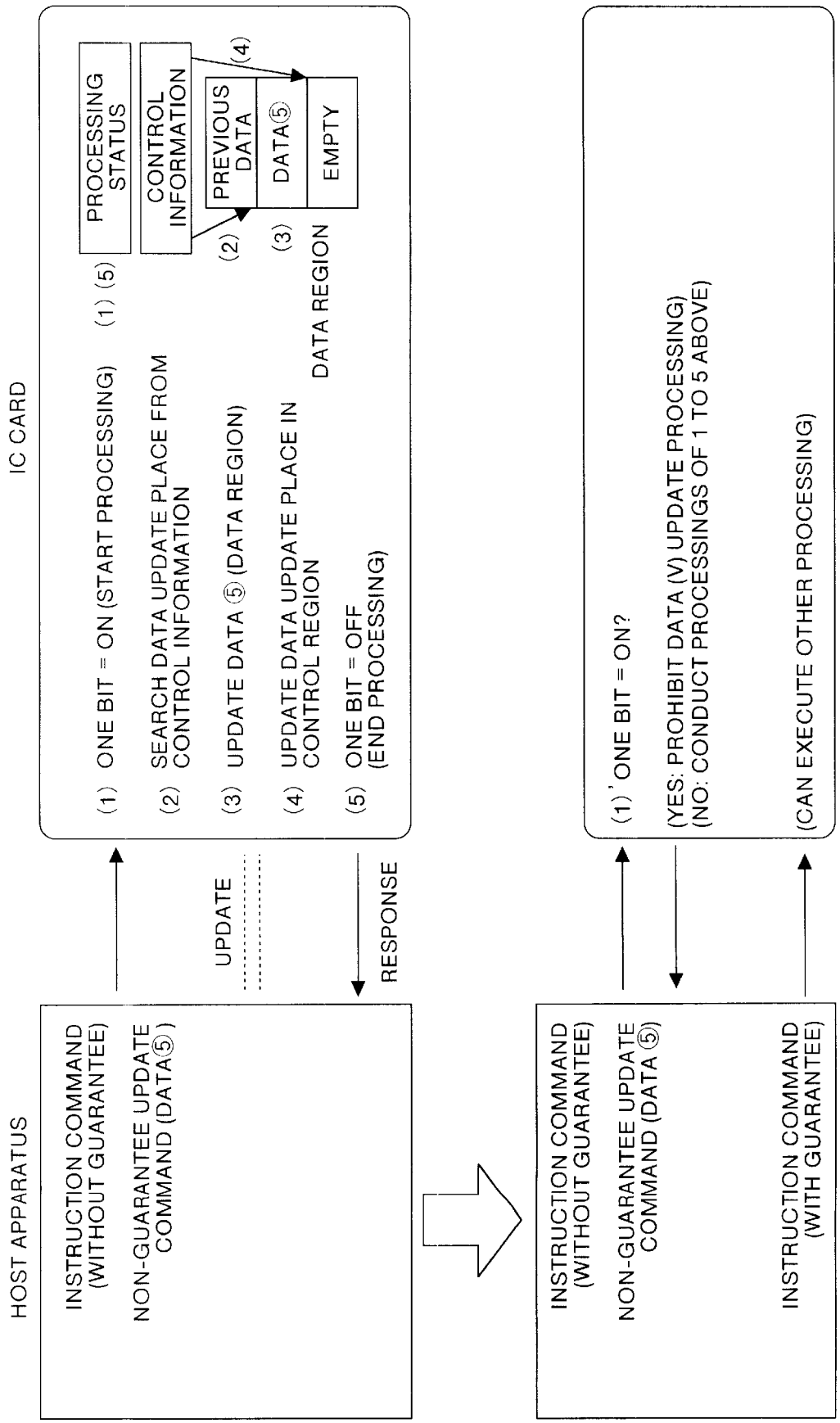

IC CARD, A METHOD OF CONTROLLING UPDATE OF DATA, A METHOD OF CONTROLLING RESTORATION OF DATA OR MESSAGES, AND A COMPUTER PRODUCT

FIELD OF THE INVENTION

The present invention relates in general to a contact type of IC card which reads/writes data through a particular terminal, or a non-contact type of IC card which reads/writes data through a radio interface. More particularly, this invention relates to a technology for normally restoring data and a message relating to an interrupted processing if the processing is stopped due to the interruption of the supply of power or the supply of radio wave or if data which is being received is discontinued and the processing is then resumed.

BACKGROUND OF THE INVENTION

In recent years, IC cards each including a CPU and having a higher capacity than that of a magnetic card have been introduced in many places. The IC card has been studied as a successor to the magnetic card and gradually employed as, for example, a credit card or a personal card for storing welfare/health data. In the future, it is expected to spread IC cards each of which can be used as a multifunctional card system allowing a single card to fulfill the functions of various types of cards or a card system allowing a user to receive more services in cooperation with other card service businesses.

The operation of a conventional IC card will be described here. A contact IC card, for example, is supplied with power from a host apparatus through a power terminal and operates an IC chip in the IC card. A non-contact IC card, on the other hand, is supplied with radio wave from a host apparatus, converts the received wave into power in the IC card and operates an IC chip.

The data write processing flow of the conventional IC card will be described. FIG. 11 is a flow chart showing a data write processing flow. First, a host apparatus transmits an update command (including update data) to the IC card (in a step S101). The host apparatus then turns into a state of waiting for a response from the IC card.

The IC card receives the update command from the host apparatus (in a step S102), and searches for a place where data is to be updated based on control information (which is pointer information indicating up to which region data was written in a previous processing) stored within the IC card (in a step S103). At this moment, the IC card writes update data to the next region (or address) to that of the previous data stores in a memory region (in a step S104). After completing writing data, the IC card updates the control information (in a step S105) and further transmits a response indicating that a write processing was normally ended, to the host apparatus (in a step S106).

Finally, the host apparatus receives the response from the IC card with which the host apparatus communicates and previously transmitted the update command, and ends a series of data write processings (in a step S107).

In this way, the conventional IC card rewrites data under the control of the host apparatus, whereby the data stored in the memory such as credit card information, personal information for storing welfare/health data and charge information, can be always held in an update state.

In IC cards in general, however, power may possibly be stopped during a write processing for some reason. If so, the operation of the IC card is stopped. In case of the contact IC card, for example, this may be because the supply of power from the host apparatus is interrupted due to some trouble, a contact failure occurs to a power supply terminal, the IC card is released (including a case where the IC card is purposely released) or the like. In case of the non-contact IC, by contrast, this may be because the supply of radio wave from the host apparatus is interrupted due to some trouble, an IC card user is away from areas radio waves can reach or the like.

In the above case, the supply of power to the conventional IC card is interrupted and the processing is stopped halfway. The host apparatus cannot grasp up to which processing the IC card has carried out and from which processing the host apparatus allows the IC card to carry out when the IC card is restarted. As a result, the conventional IC card is confronted with a disadvantage in that the data written in the IC card which data the host apparatus recognizes and the data actually written to the IC card contradicts.

FIG. 12 illustrates a problem in a case where old data of five bytes already stored in the IC card is updated to new data of five bytes. In FIG. 12, it is particularly assumed that the supply of power to the IC card is stopped while data is being written to the IC card or the IC card cannot receive data from the host apparatus. For example, if the supply of power is stopped when data of the third byte has been written to the IC card, a data write processing is ended at that point. As a result, the data which has been written the moment the data write processing is stopped differs from what should be originally written to the IC card.

FIG. 13 shows a concrete example of the above-stated problem. Time zones in which the supply of power is stopped may be the following three zones. The first time zone is one, as shown in ① in FIG. 13, before the IC card recognizes an update command, i.e., the supply of power is stopped before a write operation is started. In the first case, if power supply is recovered and restarted, the IC card can read the state of control information before the supply of power is stopped. However, since the write processing is not completed when the supply of power is stopped, the IC card cannot transmit a response signal for notifying the host apparatus of this state. The second time zone is one, as shown in ②, in which the supply of power is stopped while data is being written to the IC card. In this case as in the case of (1), the IC card can read the previous state of control information when the IC card is restarted but cannot transmit a response signal to the host card. The third time zone is one, as shown in ③, in which the supply of power is stopped after a data update processing is finished and new control information is written. In the third case as in the case of (1) and (2), the IC card can read the new state of control information when the IC card is restarted but cannot transmit a response signal to the host apparatus.

SUMMARY OF THE INVENTION

It is an object of the present invention to provide an IC card, a data update control method, a data/message restoration control method and a recording medium storing a control program capable of normally restoring a processing which was executed until the operation of the IC card is stopped when the IC card is restarted even if the supply of power (to the contact IC card) or the supply of radio wave (to the non-contact IC card) is stopped for some reason.

The IC card according to one aspect of this invention comprises a first storage region in which written data is not guaranteed; a second storage region in which the written data is guaranteed; a third storage region in which a status bit indicating a processing state is stored; and a processing section. When the processing section receives a first command to write the data without guarantee from a host apparatus, it sets the status bit corresponding to a write processing at a state indicating a non-guarantee write processing and writes the received data to the first storage region. On the other hand, when processing section receives a second command to write data with guarantee from the host apparatus, it sets the status bit corresponding to the write processing at a state indicating a guarantee write processing and writes the received data to the second storage region.

According to the above-mentioned aspect, one of "the data guarantee region" and "the data non-guarantee region" is designated using a predetermined command, thereby guaranteeing important data relating to operations between the host apparatus and the IC card. Thus, even if the supply of power (to the contact IC card) or the supply of radio wave (to the non-contact IC card) is stopped for some reason, for example, it is possible to normally restore the processing executed until the operation of the IC card was stopped when restarting the IC card.

The IC card according to another aspect of this invention comprises a data storage region; a control information storage region; a status bit storage region storing a status bit indicating a processing state; and a processing section. When the processing section receives a command to write data from a host apparatus, it sets the status bit corresponding to a write processing at a processing start state, sets the status bit at a processing end state after finishing writing the data based on the control information, and transmits a response message indicating that the write processing was normally ended to the host apparatus; and in restarting the IC card after the write processing is interrupted, the processing section transmits an error signal to the host apparatus if the status bit is set at the processing start state, and transmits the response message indicating processing end to the host apparatus if the status bit is set at the processing end state.

According to the above-mentioned aspect, if the supply of power (to the contact IC card) or the supply of radio wave (to the non-contact IC card) is stopped for some reason, for example, the IC card notifies the host apparatus of "information indicating that a previous processing resulted in an error" or "information indicating that the previous processing was normally ended" when the IC card is restarted. Thus, no contradiction in recognition occurs between the host apparatus and the IC card. Further, if the status bit represents a normal end state, it is possible to normally restore the data and message relating to the processing when the IC card was interrupted.

The IC card according to still another aspect of this invention comprises a data storage region; a restart point storage region storing restart point information indicating a position at which a processing is to be restarted; a saving region temporarily saving the restart point; a status bit storage region storing a status bit indicating a processing state; and a processing section. When the processing section receives a command to write data from a host apparatus, it moves the restart point information stored in the restart point storage region to the saving region, and writes a command serial number included in the command to the restart point storage region as restart point information, sets the status bit at a processing end state after completion of writing the data, and transmits a response message indicating that the processing was normally ended to the host apparatus; and in restarting the IC card after the write processing is interrupted, the processing section notifies the host apparatus of the status bit and the restart point processing in accordance with the state of the status bit as a response message.

According to the above-mentioned aspect, if the supply of power (to the contact IC card) or the supply of radio wave (to the non-contact IC card) is stopped for some reason, for example, the host apparatus automatically transmits a restart command when restarting the IC card and the IC card which receives the restart command notifies the host apparatus of the processing status and the restart point information in accordance with the place where the supply of power was stopped. Thus, no contradiction in recognition occurs between the host apparatus and the IC card and it is possible to restart the update processing at an optimum position.

The IC card according to still another aspect of this invention comprises a data storage region; a control information storage region; a saving region temporarily saving control information; and a processing region. When the processing section receives a command to write data from a host apparatus, it moves the control information stored in the control information storage region to the saving region, sets a status bit corresponding to a write processing at a processing start state, searches a data update place from the control information, stores write data included in the command in the searched update place, updates the update place for the data stored as the control information to a next data region, sets the status bit at a processing end state, and transmits a response message indicating that the processing was normally ended to the host apparatus; and in restarting the IC card after the write processing is interrupted, the processing section judges whether to restore the control information transmitted to the host apparatus in accordance with the state of the status bit.

According to the above-mentioned aspect, if the supply of power (to the contact IC card) or the supply of radio wave (to the non-contact IC card) is stopped for some reason, for example, the host apparatus automatically transmits a restart command when the IC card is restarted and the IC card which receives the restart command restores or holds the control information in accordance with the place where the supply of power was stopped. Thus, no contradiction in recognition occurs between the host apparatus and the IC card and it is possible to normally restore the data and message relating to the interrupted update processing.

The IC card according to still another aspect of this invention comprises a data storage region; a saving region temporarily saving data from a host apparatus; a status bit storage region storing a status bit indicating a processing state; and a processing section. When the processing section receives a command to write the data from the host apparatus, it moves the data stored in the data storage region to the saving region, sets the status bit corresponding to a write processing at a processing start state, writes data included in the command to the data storage region, sets the status bit at a processing end state, and transmits a response message indicating that the processing was normally ended to the host apparatus; and in restarting the IC card after the write processing is interrupted, the processing section judges whether to restore the data region in accordance with the state of the status bit.

According to the above-mentioned aspect, if the supply of power (to the contact IC card) or the supply of radio wave (to the non-contact IC card) is stopped for some reason, for example, the host apparatus automatically transmits the restart command when the IC card is restarted and the IC card which receives the restart command restores or holds the data region in accordance with the place where the supply of power was stopped. Thus, no contradiction in recognition occurs between the host apparatus and the IC card and it is possible to normally restore the data and message relating to the interrupted update processing.

The data update control method according to still another aspect of this invention comprises a first write step of, if receiving a first command to write data without guarantee from externally, setting the status bit corresponding to a write processing at a state indicating a non-guarantee write processing and writing the received data to a data non-guarantee storage region; and a second write step of, if receiving a second command to write data with guarantee from externally, setting the status bit corresponding to the write processing at a state indicating a guarantee write processing and writing the received data to a data guarantee region.

According to the above-mentioned aspect, one of "the data guarantee region" and "the data non-guarantee region" is designated using a predetermined command, thereby guaranteeing important data relating to operations between the host apparatus and the IC card. Thus, even if the supply of power (to the contact IC card) or the supply of radio wave (to the non-contact IC card) is stopped for some reason, for example, it is possible to normally restore the processing executed until the operation of the IC card was stopped when restarting the IC card.

The data update control method according to still another aspect of this invention comprises a first status setting step of, if receiving a command to write data from a host apparatus, setting a status bit corresponding to a write processing at a processing start state; a second status setting step of setting the status bit at a processing end state after finishing writing the data based on control information; a response transmission step of transmitting a response message indicating that the write processing was normally ended to externally; and a restart step of, in restarting after the write processing is interrupted, transmitting an error signal to the host apparatus if the status bit is set at the processing start state, and transmitting the response message indicating processing end to externally if the status bit is set at the processing end state.

According to the above-mentioned aspect, if the supply of power (to the contact IC card) or the supply of radio wave (to the non-contact IC card) is stopped for some reason, for example, the IC card notifies the host apparatus of "information indicating that a previous processing resulted in an error" or "information indicating that the previous processing was normally ended" when the IC card is restarted. Thus, no contradiction in recognition occurs between the host apparatus and the IC card. Further, if the status bit represents a normal end state, it is possible to normally restore the data and message relating to the processing when the IC card was interrupted.

The data update control method according to still another aspect of this invention comprises a saving step of, if receiving a command to write data from externally, moving restart point information to a saving region; a first status setting step of setting a status bit corresponding to a write processing at a processing start state; a restart point setting step of updating current restart point information to a command serial number included in the command; a data write step of wiring the data included in the command to a predetermined data storage region; a second status setting step of setting the status bit at a processing end state after ending writing the data; a response transmission step of transmitting a response message indicating that the processing was normally ended to externally; and a restart step of, in restarting after the write processing is interrupted, notifying the status bit and restart point processed in accordance with the state of the status bit as the response message.

According to the above-mentioned aspect, if the supply of power (to the contact IC card) or the supply of radio wave (to the non-contact IC card) is stopped for some reason, for example, the host apparatus automatically transmits a restart command when restarting the IC card and the IC card which receives the restart command notifies the host apparatus of the processing status and the restart point information in accordance with the place where the supply of power was stopped. Thus, no contradiction in recognition occurs between the host apparatus and the IC card and it is possible to restart the update processing at an optimum position.

The data update control method according to still another aspect of this invention comprises a saving step of, if receiving a command to write data from externally, moving present control information to a saving region; a first status setting step of setting a status bit corresponding to a write processing at a processing start state; a search step of searching a data update place from the control information; a data storage step of storing write data included in the command in the searched update place; a control information update step of updating the update place for the data stored as control information to a next data region; a second status setting step of setting the status bit at a processing end state; a response setting step of transmitting a response message indicating that the processing was normally ended to externally; and a restart step of, in restarting after the write processing is interrupted, judging whether to restore the control information transmitted to externally in accordance with the state of the status bit.

According to the above-mentioned aspect, if the supply of power (to the contact IC card) or the supply of radio wave (to the non-contact IC card) is stopped for some reason, for example, the host apparatus automatically transmits a restart command when the IC card is restarted and the IC card which receives the restart command restores or holds the control information in accordance with the place where the supply of power was stopped. Thus, no contradiction in recognition occurs between the host apparatus and the IC card and it is possible to normally restore the data and message relating to the interrupted update processing.

The data update control method according to still another aspect of this invention comprises a saving step of, if receiving a command to write data from externally, moving data stored in a data storage region to a saving region; a first status setting step of setting a status bit corresponding to a write processing at a processing start state; a data write step of writing data included in the command to a data storage region; a second status setting step of setting the status bit at a processing end state; a response transmission step of transmitting a response message indicating that the processing was normally ended to externally; and a restart step of, in restarting after the write processing is interrupted, judging whether to restore the data region in accordance with the state of the status bit.

According to the above-mentioned aspect, if the supply of power (to the contact IC card) or the supply of radio wave (to the non-contact IC card) is stopped for some reason, for example, the host apparatus automatically transmits the restart command when the IC card is restarted and the IC card which receives the restart command restores or holds the data region in accordance with the place where the supply of power was stopped. Thus, no contradiction in recognition occurs between the host apparatus and the IC card and it is possible to normally restore the data and message relating to the interrupted update processing.

The data/message restoration control method according to still another aspect of this invention comprises a first command transmission step in which a host apparatus transmits a command to write data; a first status setting step in which an IC card sets a status bit corresponding to a write processing at a processing start state based on the received command; a second status setting step in which the IC card sets the status bit at a processing end state after finishing writing the data based on the control information; a response transmission step in which the IC card transmits a response message indicating that the processing was normally ended to the host apparatus; a second command transmission step in which the host apparatus retransmits the command to write data if the write processing is interrupted and the host apparatus receives no response from the IC card; and a data/message restoration step in which the IC card receives the retransmitted command, prohibits the write processing and transmits an error signal to the host apparatus if the status bit is set at the processing start state, and transmits the response message to the host apparatus after restoring the data and the response message indicating the processing end by means of a rewrite processing if the status bit is set at the processing end state.

According to the above-mentioned aspect, if the supply of power (to the contact IC card) or the supply of radio wave (to the non-contact IC card) is stopped for some reason, for example, the IC card notifies the host apparatus of "information indicating that a previous processing resulted in an error" or "information indicating that the previous processing was normally ended" when the IC card is restarted. Thus, no contradiction in recognition occurs between the host apparatus and the IC card. Further, if the status bit represents a normal end state, it is possible to normally restore the data and message relating to the processing when the IC card was interrupted.

The data/message restoration control method according to still another aspect of this invention comprises a first command transmission step in which a host apparatus transmits a command to write data; a saving step in which an IC card moves restart point information to a saving region based on the received command; a first status setting step of setting a status bit corresponding to a write processing at a processing start state; a restart point setting step of updating the present restart point information to a command serial number included in the command; a data write step of writing data included in the command to a predetermined data storage region; a second status setting step of setting the status bit at a processing end state after ending writing the data; a response transmission step of transmitting a response message indicating that the processing was normally ended, to the host apparatus; a restart command transmission step in which the host apparatus transmits a restart command when restarting the IC card if the write processing is interrupted and the host apparatus receives no response; a restart point transmission step in which the IC card notifies the host apparatus of the status bit and a restart point processed in accordance with the state of the status bit as the response message; a second command transmission step in which the host apparatus transmits a data write command corresponding to the received restart point; and a data/message restoration step in which the IC card receives the command and restores the data and the response message indicating processing end by means of a rewrite processing.

According to the above-mentioned aspect, if the supply of power (to the contact IC card) or the supply of radio wave (to the non-contact IC card) is stopped for some reason, for example, the host apparatus automatically transmits a restart command when restarting the IC card and the IC card which receives the restart command notifies the host apparatus of the processing status and the restart point information in accordance with the place where the supply of power was stopped. Thus, no contradiction in recognition occurs between the host apparatus and the IC card and it is possible to restart the update processing at an optimum position.

The data/message restoration control method according to still another aspect of this invention comprises a first command transmission step in which a host apparatus transmits a command to write data; a saving step in which an IC card moves present control information to a saving region based on the received command; a first status setting step of setting a status bit corresponding to a write processing at a processing start state; a search step of searching a data update place from the control information; a data storage step of storing write data included in the command, in the searched update place; a control information update step of updating the update place for the data stored as the control information to a next data region; a second status setting step of setting the status bit at a processing end state; a response setting step of transmitting a response message indicating that the processing was normally ended to the host apparatus; a restart command transmission step in which the host apparatus transmits a restart command when the IC card is restarted if the write processing step is interrupted and the host apparatus receives no response from the IC card; judgment result transmission step in which the IC card judges whether to restore the control information transmitted to the host apparatus in accordance with the state of the status bit after receiving the restart command, and transmitting a judgment result to the host apparatus as the response message; a second command transmission step in which the host apparatus transmits a data write command corresponding to the received judgment result; and a data/message restoration step in which the IC card receives the command and restores the data and the response message indicating processing end by means of a rewrite processing.

According to the above-mentioned aspect, if the supply of power (to the contact IC card) or the supply of radio wave (to the non-contact IC card) is stopped for some reason, for example, the host apparatus automatically transmits a restart command when the IC card is restarted and the IC card which receives the restart command restores or holds the control information in accordance with the place where the supply of power was stopped. Thus, no contradiction in recognition occurs between the host apparatus and the IC card and it is possible to normally restore the data and message relating to the interrupted update processing.

The data/message restoration control method according to still another aspect of this invention comprises a first command transmission step in which a host apparatus transmits a data write command; a saving state in which an IC card moves data stored in a data storage region to a saving region based on the received command; a first status setting step in which the IC card sets a status bit corresponding to a write processing at a processing start state; a data write step in which the IC card writes data included in the command to the data storage region; a second status setting step in which the IC card sets the status bit at a processing end state; a response transmission step in which the IC card transmits a response message indicating a processing was normally ended to the host apparatus; in restarting if sad write processing is interrupted and the host apparatus receives no response from the IC card, a restart command transmission step in which the host apparatus transmits a restart command; a judgment result transmission step in which the IC card judges whether to restore the data region in accordance with a state of the status bit after receiving the restart command, and transmits a judgment result to the host apparatus as the response message; a second update command transmission step in which the host apparatus transmits the data write command corresponding to the received judgment result; and a data/message restoration step in which the IC card receives the command and restores the data and the response message indicating processing end by means of a rewrite processing.

According to the above-mentioned aspect, if the supply of power (to the contact IC card) or the supply of radio wave (to the non-contact IC card) is stopped for some reason, for example, the host apparatus automatically transmits the restart command when the IC card is restarted and the IC card which receives the restart command restores or holds the data region in accordance with the place where the supply of power was stopped. Thus, no contradiction in recognition occurs between the host apparatus and the IC card and it is possible to normally restore the data and message relating to the interrupted update processing.

The computer readable medium stores a computer program which when executed realizes the methods according to the present invention.

Other objects and features of this invention will become apparent from the following description with reference to the accompanying drawings.

BRIEF DESCRIPTION OF THE DRAWINGS

FIG. 7 shows a data restoration control method in the second embodiment according to the present invention;

DESCRIPTION OF THE PREFERRED EMBODIMENTS

Preferred embodiments of the present invention will be described in detail with reference to the attached drawings. The present invention is not limited by these embodiments.

Figure 1:
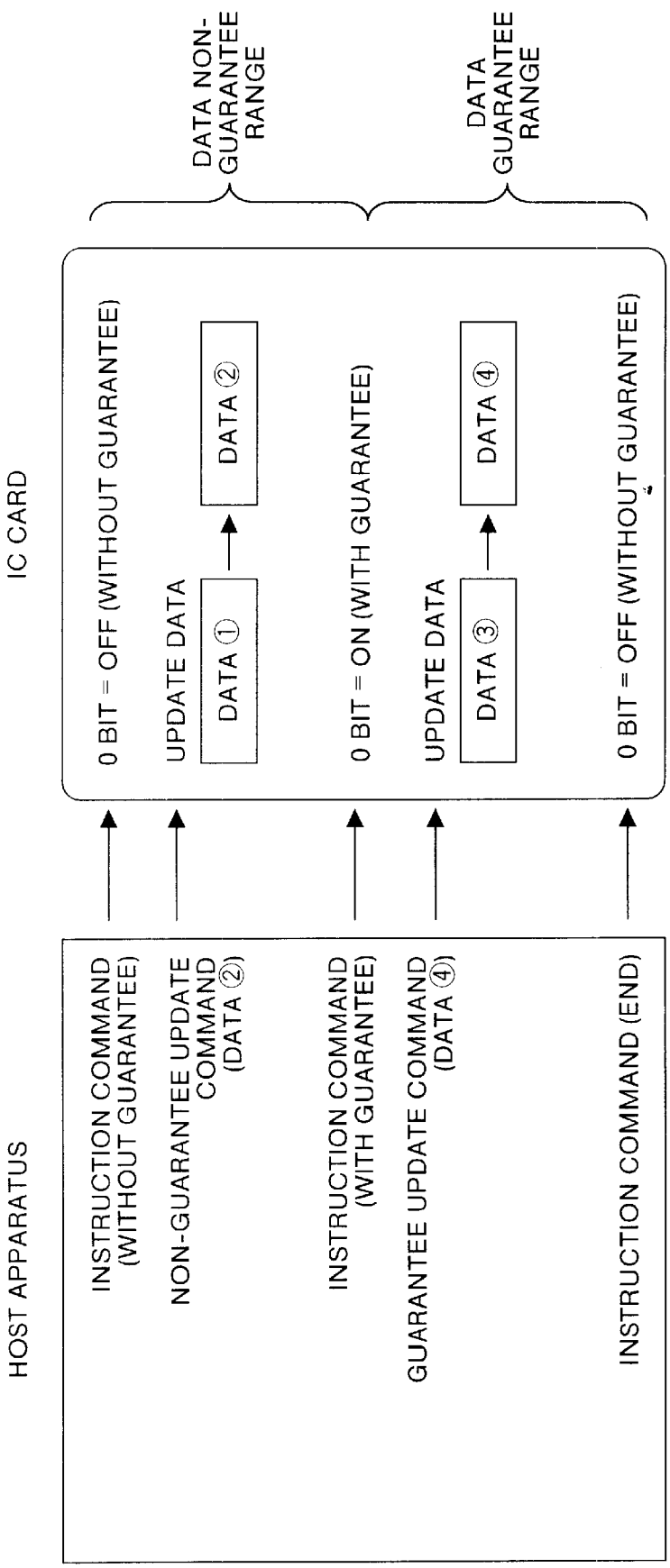
FIG. 1 shows a data restoration control method in the first embodiment according to the present invention.

FIG. 1 shows a data/message restoration control method in the first embodiment. In case of a contact IC card, for example, if the supply of power to the IC card from a host apparatus is interrupted, a contact failure occurs to a power supply terminal or the IC card is released for some trouble, then the supply of power to the IC card may sometimes be stopped while data is being written to the IC card. In case of a non-contact IC card, if the supply of radio wave to the IC card from a host apparatus is interrupted or an IC card user is away from areas which radio wave can reach, then the supply of power to the IC card may sometimes be stopped suddenly while data is being written to the IC card. Further, even if the IC card is normally supplied with power, data to be transferred from the host apparatus to the IC card may sometimes be discontinued because a contact failure occurs to a terminal, radio wave cannot reach the IC card or the like.

To deal with the above cases, in the first embodiment, the host apparatus designates, as the storage region of an IC card to which data is written, one of a data guarantee region and a data non-guarantee region and important data is written to the data guarantee region. By doing so, it is possible to avoid contradiction resulting from the fact that IC card data is not updated, between information in the IC card recognized by the host apparatus and data actually stored in the IC card.

Figure 2:
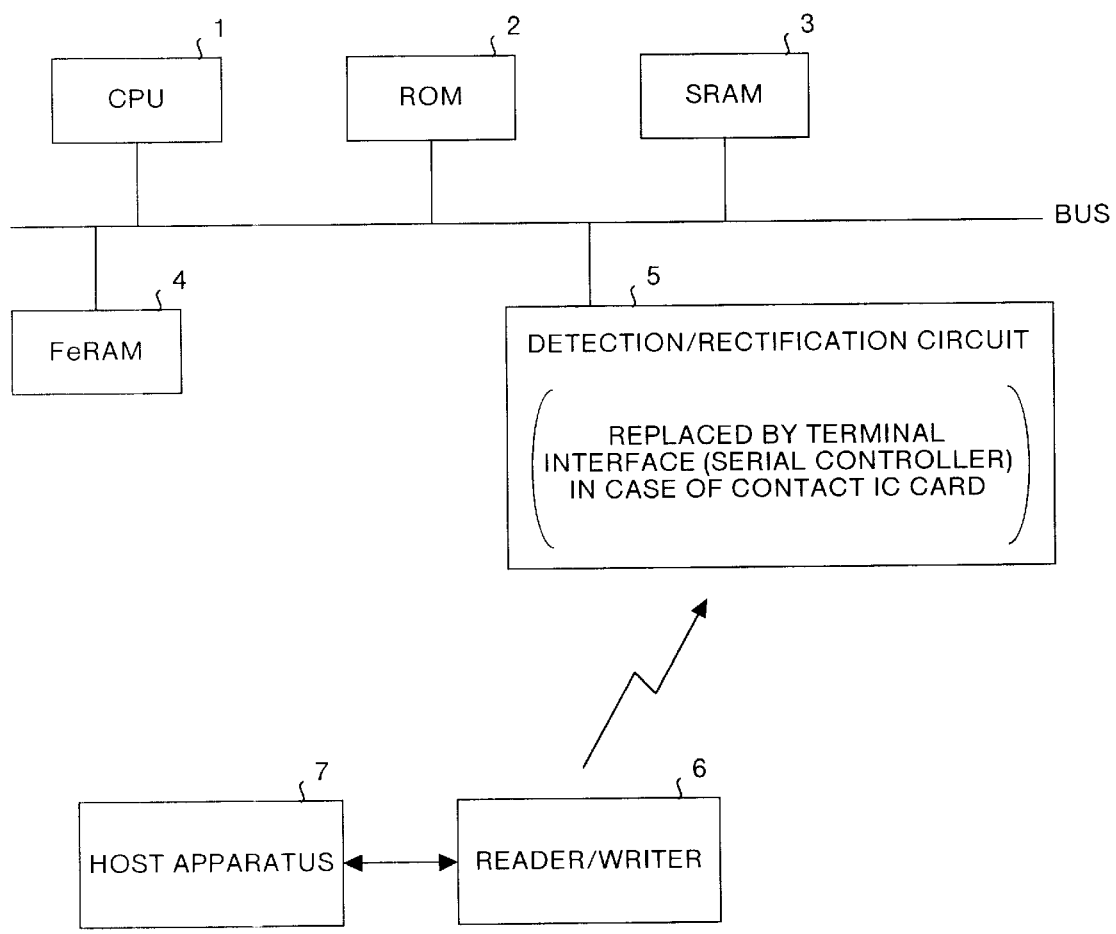
FIG. 2 is a block diagram of an IC card according to the present invention.

Here, the constitution and operation of the IC card which can execute the data/message restoration control method in this embodiment shown in FIG. 1 will be described. FIG. 2 shows an example of the constitution of the IC card in this embodiment. The following operation will be described, while taking a non-contact IC card as an example. In FIG. 2, reference numeral 1 denotes a CPU, 2 denotes an ROM, 3 denotes an SRAM, 4 denotes an FeRAM, 5 denotes a detection/rectification circuit, 6 denotes a reader/writer and 7 denotes a host apparatus. The CPU 1, the ROM 2, the SRAM 3, the FeRAM 4 and the detection/rectification circuit 5 constituting the non-contact IC card are mutually connected through system buses. It is noted that the IC card is an example of a recording medium.

The non-contact IC card constituted as stated above is supplied with radio wave from the host apparatus, converts the radio wave into power and operates an IC chip. In this embodiment, the FeRAM 4 (a type of a nonvolatile memory) which is a ferroelectric memory having the same write time as that of an ordinary SRAM and which can be used as a program memory and a work memory, is used in this embodiment. Memory type is not essential to the present invention and should not be limited to this type. Various types of memories can be used according to the present invention.

In this embodiment, for the sake of description, the features of the present invention will be described while using the non-contact IC card (which will be referred to simply as "IC card" hereinafter). However, the present invention should not be limited to the non-contact IC card and the same advantage can be obtained if, for example, a contact IC card is employed. In case using the contact IC card, however, the detection/rectification circuit 5 is replaced by a serial controller.

In FIG. 2, the CPU 1 executes an application program to operate the IC card. The ROM 2 includes memories such as an EPROM and an EEPROM and stores the program to be executed by the CPU 1. The SRAM 3 operates as a work region (or a work memory) and stores data, e.g., the data obtained in the course of processings. The FeRAM 4 operates as a program memory and a work memory, and stores important write data to be particularly guaranteed. The detection/rectification circuit 5 receives a signal from the host apparatus 7, conducts a detection processing and a rectification processing to the received signal and writes desired data to the FeRAM 4 or the SRAM. In case of the contact IC card, the serial controller writes data supplied from an I/O terminal to the FeRAM 4 or the SRAM 3 in accordance with a specified protocol.

Figure 3:
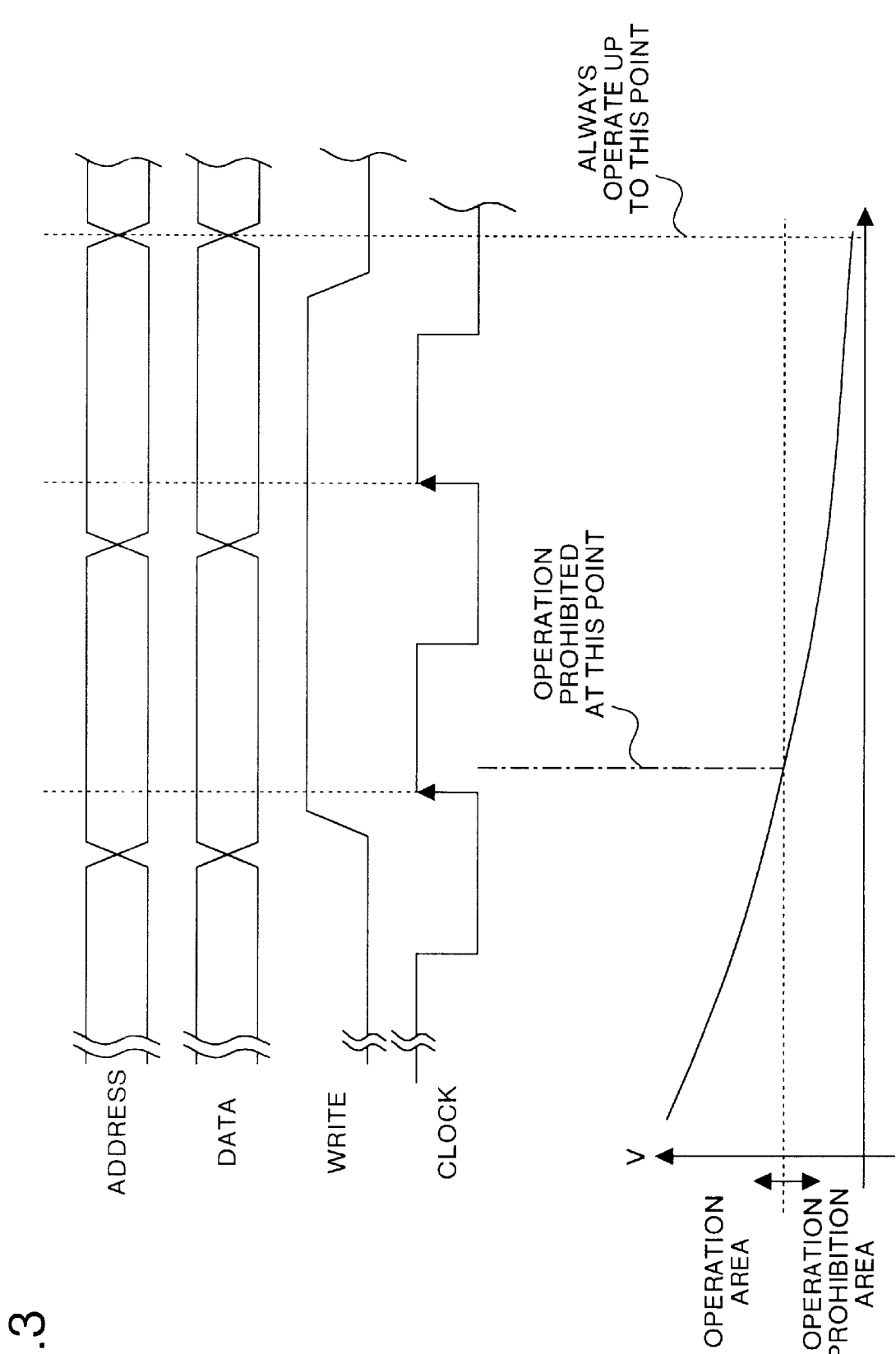
FIG. 3 is a timing chart showing a write cycle (word: two cycles)

Next, description will be given about an IC card write processing according to the present invention. In this embodiment, it is assumed that the supply of radio wave (or power) is stopped for some reason while a write cycle is being executed. FIG. 3 is a timing chart showing a write cycle (word: two cycles) for the IC card which can be applied to this embodiment. For example, when an effective address and data are inputted into the FeRAM 4 and a write signal is active (which is assumed to be High active in this embodiment for the sake of convenience), a data write processing is started synchronously with rising clock timing.

In this state, if the supply of power to the IC card is stopped at timing (indicated by dashed lines) shown in FIG. 3, the IC card continues the write cycle by using electric charges stored in a ferroelectric capacitor in the FeRAM 4 and guarantees the operation of the write cycle while the write operation is being executed. Namely, when the IC card is executing one-byte data write, the IC card continues the write cycle until a one-byte data write processing is completed. When executing word write, the IC card continues the write cycle until a two-byte write processing is completed (see FIG. 3).

Figure 4:
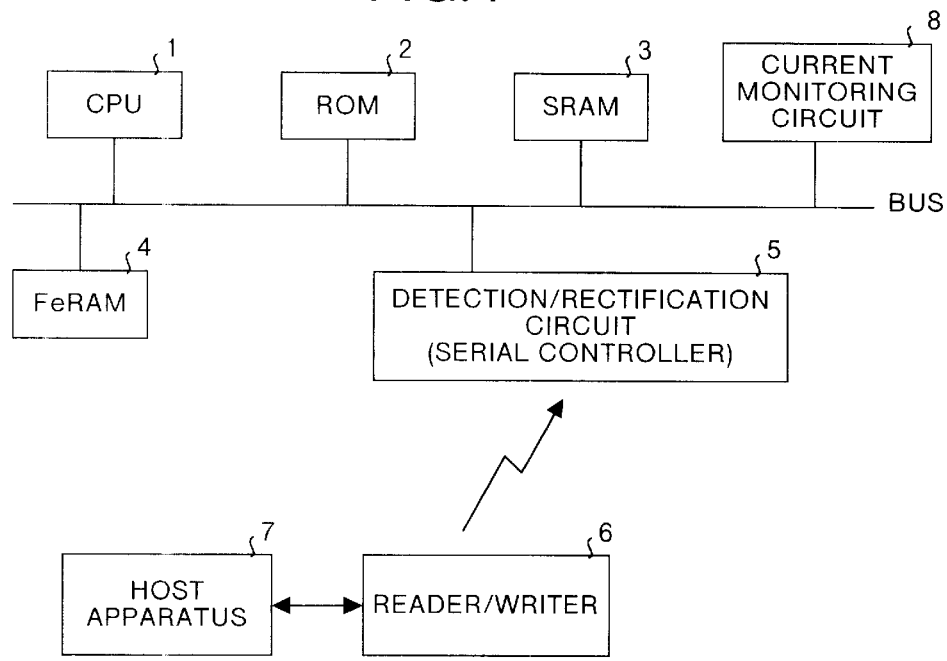
FIG. 4 is a block diagram of an IC card other than the IC card shown in FIG. 2.

FIG. 4 shows the constitution of an IC card other than the IC card shown in FIG. 2. In FIG. 4, the IC card comprises a power supply monitoring circuit 8 for monitoring the voltage level of the power supply in addition to the constituent elements shown in FIG. 2 stated above. This constitution allows guaranteeing operation while the supply of power is unstable and accelerating processing speed.

Figure 5:
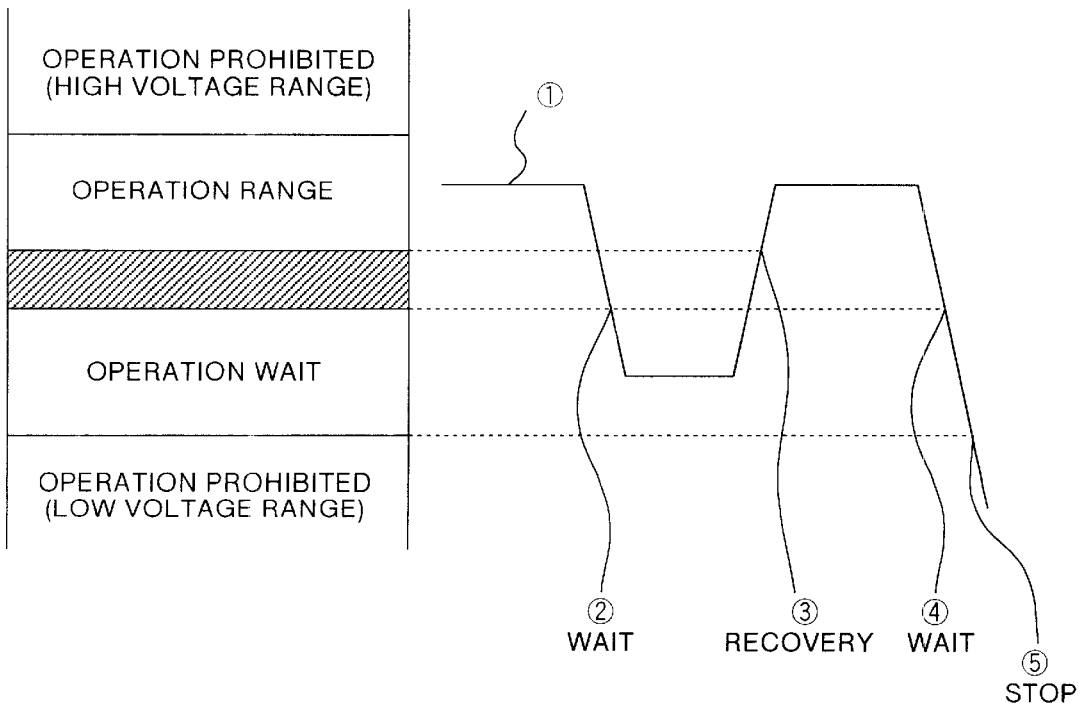
FIG. 5 shows a power supply monitoring method which can be executed by the IC card shown in FIG. 4.

FIG. 5 shows a power supply monitoring method which can be executed by the IC card shown in FIG. 4. In the IC card shown in FIG. 4, power supply voltage during ordinary operation (corresponding to ① in FIG. 5) gradually decreases and the IC card turns into a wait state when the power supply voltage becomes the level of ②. This state is not a state in which the operation of the IC card is completely inactivated but a state in which the CPU in the IC card is waiting, i.e., in which a CPU processing is not carried out.

From this state, when the power supply voltage gradually increases and reaches the level of the power supply voltage of ③, the CPU returns from the wait state to the ordinary state and starts the next processing to that executed before the wait state. Namely, the CPU restarts processings without activating the IC card.

On the other hand, when the power supply voltage of gradually decreases during the ordinary operation (corresponding to ③ in FIG. 5) and reaches the power voltage ④, the CPU turns into a wait state again. When the power supply voltage continues to decrease further and reaches the level of the power supply voltage of ⑤, the operation of the IC card is eventually, completely stopped, i.e., the IC card turns into an inactive state.

The detection of the power supply voltage stated above is conducted by the power supply monitoring circuit 8. The power supply monitoring circuit 8 notifies the CPU 1 of each state by generating, for example, an interruption signal.

The IC card constituted as shown in FIG. 2 or 4 executes the data/message restoration control method in the embodiment shown in FIG. 1. It is noted that the IC card of type other than the above-stated type may be used in this embodiment. Further, the IC card shown in FIG. 2 or 4 executes "a control program" for realizing the data/message restoration control method shown in FIG. 1. That is, the ROM 2 shown stores a data/message restoration control program shown in FIG. 1.

Next, the data/message restoration control method in the embodiment shown in FIG. 1 will be described in detail. In this embodiment, if the host apparatus transmits data to be written to the IC card, the host apparatus transmits a predetermined command to the IC card and designates whether the region of the IC card to which data is to be written is "the data guarantee region" or "the data non-guarantee region". For example, if the host apparatus designates "the data non-guarantee region", the host apparatus transmits an instruction command to the IC card to write data to the non-guarantee region and transmits an update command including data ② serving as write data to the IC data. It is noted that "update" is one type of "write".

Figure 6A:
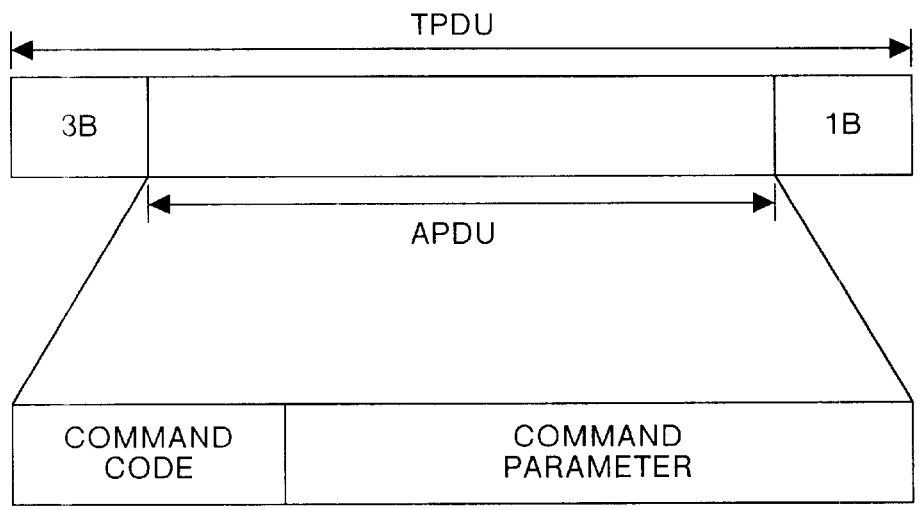
FIG. 6 shows a data format between the host apparatus and the IC card.
Figure 6B:
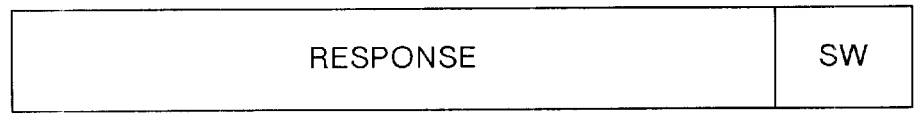

The data format of each command (TPDU: Transfer protocol data unit) is specified as shown in, for example, FIG. 6 and consists of three-byte header information, an APDU (Application protocol data unit) and one-byte tail information. The APDU becomes "command code+ command parameter (data length or the like)" (see FIG. 6A), in case of "host apparatus IC card", and becomes "response+ SW (status word)" (see FIG. 6B) in case of "IC card host apparatus". To be specific, if command data is "A0", the APDU represents "an instruction command" and information indicating "non-guarantee" or "guarantee" is indicated to the command parameter at this moment. The other command code represents "an update (write) command" and information indicating a parameter such as data length is indicated to the command parameter at this moment.

The IC card which receives the non-guarantee instruction command and the update command from the host apparatus, the IC card sets a status bit (0 bit) corresponding to this write processing to be in an off state indicating that data is written to the non-guarantee region. Thereafter, the data ① previously written to the IC card is updated to the data ② received from the host apparatus. The data ② included in this update command is relatively unimportant data such as log data.

If the host apparatus designates "the data guarantee region" as the data write region, the host apparatus first transmits an instruction command including information indicating that data is written to the guarantee region and then transmits an update command including data ④ serving as write data.

The IC card which receives the guarantee instruction command and the update command from the host apparatus, the IC card sets a status bit corresponding to this write processing to be in an off state indicating that data is written to the guarantee region. Thereafter, the data ③ previously written to the guarantee region of the IC card is updated to the data ④ received from the host apparatus. The data ④ included in this update command is important data such as result data.

As explained above, in this embodiment, the host apparatus designates whether the data write region is "the data guarantee region (corresponding to the region of the nonvolatile memory such as the FeRAM) or "the data non-guarantee region (corresponding to the region of the SRAM) to the IC card. By doing so, it is possible to guarantee important data relating to the operations conducted between the host apparatus and the IC card and to hold data stored in the data guarantee region in the memory when the IC card is restarted even if the supply of power (to the contact IC card) or the supply of radio wave (to the non-contact IC card) is stopped for some reason or even if a failure occurs and the write/update processing is interrupted thereby such as a case where data is discontinued. Further, in this embodiment, the data stored in the data guarantee region can be utilized when the IC card is restarted and important data can be, therefore, normally restored.

It is noted that the data format shown in FIG. 6 is also applied to the following embodiments in the same manner.

FIG. 7 shows a data/message restoration control method in the second embodiment. A "control program" in this embodiment is stored in the ROM 2 as in the case of the first embodiment.

The data/message restoration control method in the second embodiment will be described hereinafter. In this embodiment, description will be given to a case where the host apparatus instructs the IC card to write/update data to the non-guarantee region. This embodiment should not be limited to this case. If a data update processing is conducted, the host apparatus first transmits an instruction command to the IC card to write data to the non-guarantee region. Then, the host apparatus transmits an update command including data ⑤ serving as write data to the IC card.

The IC card which receives each command sets a status bit to this processing is allotted to be in an on state indicating processing start (at processing start) (corresponding to (1) in FIG. 6). Next, the IC card searches a place where the received data is updated (corresponding to (2) in FIG. 6). The control information indicates positional information on a memory region in which the data is updated and the like. Thereafter, the IC card writes the data ⑤ received from the host apparatus to the searched update place (corresponding to (3) in FIG. 6). The IC card then changes/updates the place where the control information data is updated to an address right after the memory region in which the data ⑤ is written (corresponding to (4) in FIG. 6). Finally, the IC card sets the status bit to which this processing is allotted to be in an off state indicating processing end (corresponding to (5) in FIG. 6), and transmits a response message indicating that the update processing was ended, to the host apparatus.

In the above processing, if the supply of power (to the contact IC card) or the supply of radio wave (to the non-contact IC card) is stopped for some reason while the data ⑤ is being written the IC card interrupts the data write processing. If the data is discontinued, the IC card interrupts the data write/update processing, as well. Then, if the power supply is recovered and the IC card starts its operation again, the host apparatus transmits an instruction command to write data to the non-guarantee region again, and transmits an update command including the data serving as write data. These commands are transmitted if the IC card transmits no response to the host apparatus within a predetermined time after the transmission of the first command.

At this moment, the IC card which receives each command checks whether the one bit is kept to be in the on state (processing start state) or the off state (processing end state) (corresponding to (1) in FIG. 6). If the one bit is kept in the off state, for example, it represents that the write processing remains interrupted. Due to this, the IC card prohibits the data ⑤ update processing and transmits an error signal to the host apparatus. The data written to the memory is left interrupted. If kept in the off state, it represents that the write processing had been completed when the supply of power was stopped. Due to this, the IC card normally conducts the processings (1) to (5) and then transmits a response message to the host apparatus when the data write processing is completed.

As explained above, in this embodiment, if the supply of power (to the contact IC card) or the supply of radio wave (to the non-contact IC card) is stopped for some reason, the IC card notifies the host apparatus of "information indicating that the previous processing resulted in an error" or "information indicating that the previous processing was normally ended". By doing so, no contradiction in the recognition of data write/update state occurs between the host apparatus and the IC card. Besides, if the status bit represents that the processing was normally ended, it is possible to normally restore the data and message relating to the processing conducted when the operation of the IC card was interrupted.

It is noted that processings other than the data write/update processing can be executed even if it is prohibited to update the data ⑤.

Figure 8:
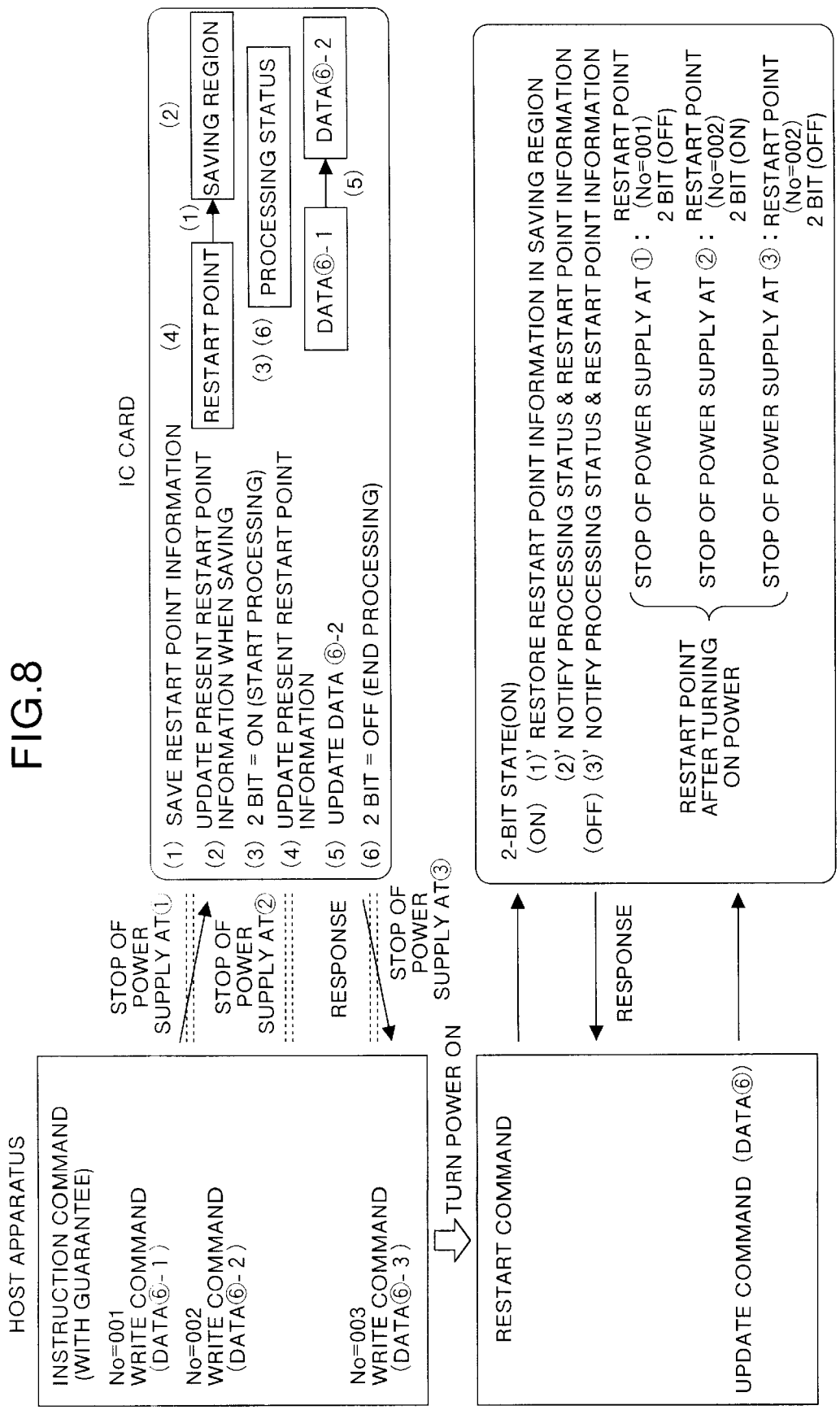
FIG. 8 shows a data restoration control method in the third embodiment according to the present invention.

FIG. 8 shows a data/message restoration control method in the third embodiment according to the present invention. It is noted that "a control program" in this embodiment is stored in the ROM 2 as in the case of the first embodiment.

In the third embodiment, if the operation of an IC card is interrupted because the supply of power is stopped, for example, the host apparatus is notified of restart point information indicating at which point data is to be resumed when the IC card is restarted. Now, the data/message restoration control method in this embodiment will be described. In this embodiment, it is assumed that the host apparatus transmitted an instruction command to the IC card to write data to the data guarantee region in advance. It is also assumed, after transmitting the instruction command, the host apparatus transmitted a write command to the IC card. Data ⑥-1 serving as write data and a command serial number were recorded on the write command. Further, it is assumed that the command serial number increments every time each command is transmitted. When the data ⑥-1 was transmitted to the IC card, command serial number "001" has been transmitted from the host apparatus to the IC card. The command serial number transmitted from the host apparatus is written to the IC card and used to discriminate a processing corresponding to which command serial number is completed.

While the data ⑥-1 has been written to the IC card, if the host apparatus transmits an update command including the data ⑥-2 and command serial number "002", then the IC card which receives this update command moves restart point information "001" corresponding to the data ⑥-1 currently recorded on the IC card to a saving region (corresponding to (1) in FIG. 8). Next, the restart point information stored in the saving region is updated to command serial number (restart point information) "002" included in a newly received update command (corresponding to (2) in FIG. 8). Then, the IC card sets the status bit to which this processing is allotted to be in an on state indicating processing start (corresponding to (3) in FIG. 8). The IC card updates the current restart point information to "002" (corresponding to (4) in FIG. 8) Thereafter, the IC card updates the data ⑥-1 to data ⑥-2 included in the update command (corresponding to (5) in FIG. 8), and sets the status bit to which this processing is allotted to be in an off state indicating processing end (corresponding to (6) in FIG. 8). Finally, the IC card transmits a response representing that the write processing was normally completed to the host apparatus.

In the above series processings, if the supply of power is stopped at the point of, for example, ①, i.e., the supply of power (to the contact IC card) or the supply of radio wave (to the non-contact IC card) is stopped for some reason before the write operation, then the following processing is executed.

The IC card which receives the restart command from the host apparatus after the recovery of power supply checks the state of the status bit. If the status bit is in the off state, the IC card notifies the host apparatus of the processing status (the state of the status bit) at that moment and the restart point "001" as a response to the restart command (corresponding to (3)' in FIG. 8). In response, the host apparatus judges that the IC card does not complete updating the data based on the received processing status and restart point "001" and retransmits a write command to the IC card write the data ⑥-1. Finally, the IC card restores the data ⑥-1 based on the received write command and transmits a response message to the host apparatus.

Further, if the supply of power is stopped at the point of, for example ② during the above-stated processing, i.e., the supply of power (to the contact IC card) or the supply of radio wave (to the non-contact IC card) is stopped for some reason while the write processing is being carried out, then the following processing is executed.

The IC card which receives the restart command first checks the state of the status bit. If the status bit is in the on state, the IC card restores the restart point information while referring to the restart point information "002" in the saving region (corresponding to (1)' in FIG. 8). The restart point information is restored in this manner because the current restart point information possibly remains "001" depending on power supply stop timing. Next, the IC card notifies the host apparatus of the processing status at that moment and restart point "002" as a response to the restart command (corresponding to (2)' in FIG. 8). In response, the host apparatus judges at which point the update processing of the IC card is ended based on the received processing status and restart point "002" and retransmits the data ⑥-2 update command to the IC card based on the judgment result. Finally, the IC card continues the data ⑥-2 update processing based on the received update command and transmits a response message to the host apparatus.

Further, if the supply of power is stopped at the position of, for example, ③ during the above-stated processing, i.e., the supply of power (to the contact IC card) or the supply of radio wave (to the non-contact IC card) is stopped for some reason after the write processing is ended, then the following processing is executed.

The IC card which receives the restart command first checks the state of the status bit. At this moment, the status bit is in the off state and the IC card notifies the host apparatus of the checked processing status and current restart point "002" as a response to the restart command (corresponding to (1) in FIG. 8). In response, the host apparatus retransmits the data ⑥-2 update command to the IC card in accordance with the received processing status and restart point (indicating a state in which the update processing is completed). Finally, the IC card transmits a response message to the host apparatus based on the received update command.

As explained above, in the third embodiment, if the supply of power (to the contact IC card) or the supply of radio wave (to the non-contact IC card) is stopped for some reason, the host apparatus automatically transmits a restart command when the IC card is restarted. The IC card which receives this restart command judges the processing status based on the status bit and restart point information and notifies the host apparatus of the processing status and restart point information in accordance with the point at which the supply of power was stopped/processing was interrupted. By doing so, no contradiction in recognition occurs between the host apparatus and the IC card and the update processing can be restarted at an optimum point.

In this embodiment, if the supply of power is stopped at the position of ③, the host apparatus is notified of the processing status (off state) and the current restart point "002". The present invention should not be limited to this embodiment. If the supply of power is stopped at the position of ③, it indicates a state in which "the processing was normally ended and no response is transmitted". Due to this, the host apparatus maybe notified of a response indicating that the previous processing was normally ended.

In this embodiment, it is assumed that the supply of power (to the contact IC card) or the supply of radio wave (to the non-contact IC card) is stopped for some reason. The present invention should not be limited to this case. For example, the present invention is also applicable to a case where an error occurs to the internal processing of the IC card. In the latter case, the IC card notifies the host apparatus of the processing status and there start point as retransmission error information (for correcting the message and conducting the same processing) or error information (for conducting a processing different from the error processing).

Figure 9:
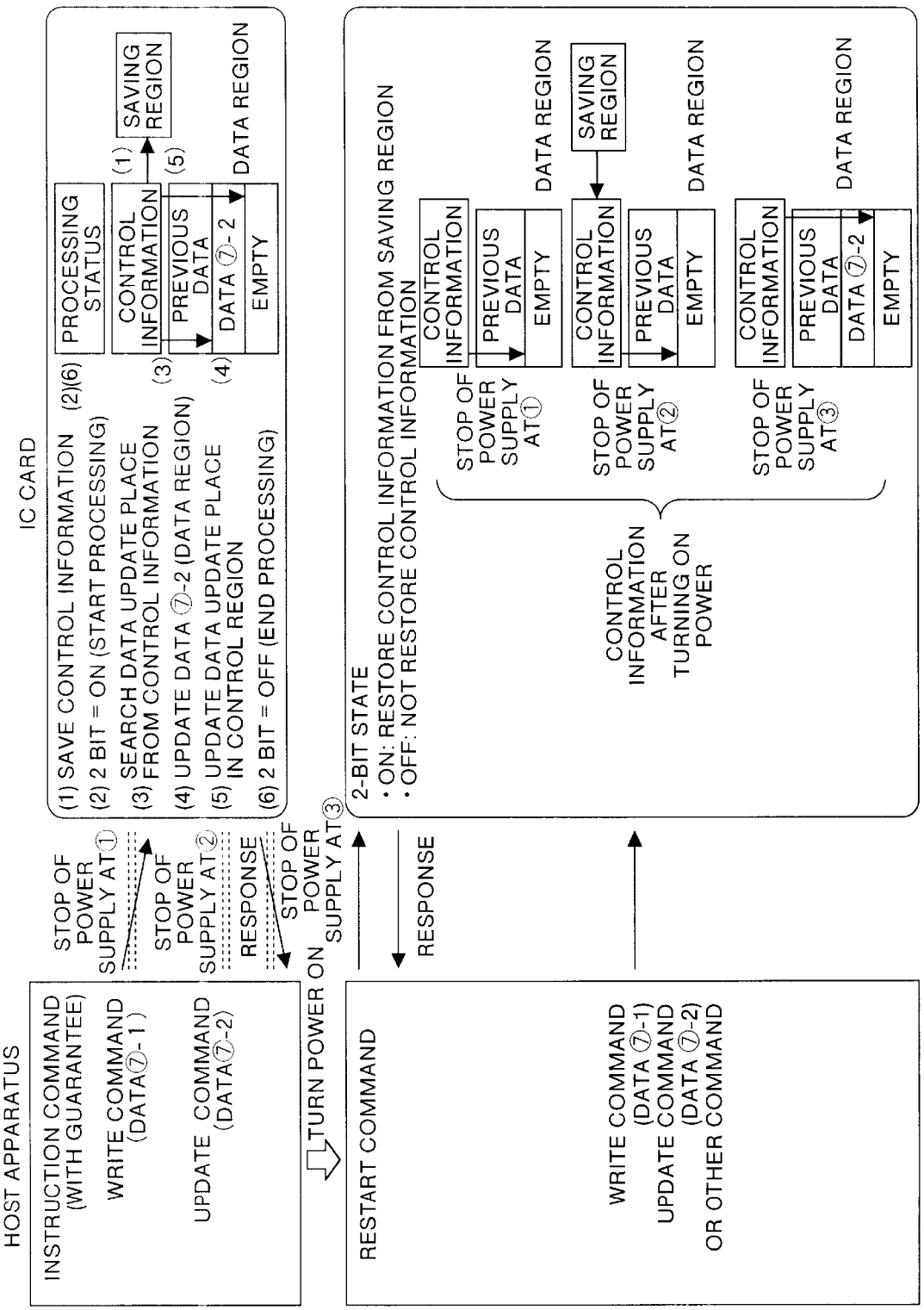
FIG. 9 shows a data restoration control method in the fourth embodiment according to the present invention.

FIG. 9 shows a data/message restoration control method in the fourth embodiment. It is noted that "a control program" in this embodiment is stored in the ROM 2 as in the case of the first embodiment.

In the fourth embodiment, it is assumed that the host apparatus instructs the IC card to write/update data to the data guarantee region and control information is restored from the saving region when the IC card is restarted if the operation of the IC card is interrupted because of the stop of the supply of power. In this embodiment, a write command basis processing means a data processing for simply adding or overwriting data to the data region (processing for simply rewriting data of 1000 yen to 1200 yen). An update command basis processing means an accumulation processing or processing relying on previous data (not a processing for simply rewriting data of 1000 yen to 1200 yen but a processing for adding 200 yen to the previous data of 1000 yen into 1200 yen).

The data/ message restoration control method in this embodiment will be described hereinafter. In this embodiment, it is assumed that the host apparatus transmitted an instruction command to the IC card to write data to the data guarantee region in advance and then transmitted a write command including data ⑦-1 serving as write data to the IC card and that the data ⑦-1 was already written to the IC card.

In this state, if the host apparatus transmits an update command including data ⑦-2, the IC card which receives this update command first moves the current control information to the saving region (corresponding to (1) in FIG. 9). This control information represents positional information on the memory region in which data is to be updated. Next, the IC card sets the status bit to which this processing is allotted to be in an on state indicating processing start (corresponding to (2) in FIG. 9), and searches a plate where the data is updated from the control information already stored in the IC card at the time the IC card received the update command (corresponding to (3) in FIG. 9).

Thereafter, the IC card updates the data stored in the searched data region to the data ⑦-2 (corresponding to (4) in FIG. 9), and updates the data update place recorded as the control information to a place after the data region in which the data ⑦-2 is written (corresponding to (5) in FIG. 9). The status bit to which this processing is allotted is set to be in an off state indicating processing end (corresponding to (6) in FIG. 9). Finally, the IC card transmits a response message indicating the update processing was normally completed to the host apparatus.

During the above-stated processing, however, if the supply of power is stopped at the point of, for example, ①, i.e., the supply of power (to the contact IC card) or the supply of radio wave (to the non-contact IC card) is stopped for some reason before the data is written, then the following processing is executed.

The IC card which receives the restart command from the host apparatus, first checks the state of the above-stated status bit. At this moment, the status bit is in the off state and the control information saved in the saving region is not restored. Next, the IC card notifies the host apparatus of the control information which is not restored, i.e., the control information recorded on the control information storage region as a response message to the restart command. The host apparatus retransmits the data ⑦-2 update command to the IC card in accordance with the received response message. Finally, the IC card updates the data based on the received update command and transmits a response message indicating data completion to the host apparatus.

Further, if the supply of power is stopped at the position of, for example, ② during the above-stated processing, i.e., the supply of power (to the contact IC card) or the supply of radio wave (to the non-contact IC card) is stopped for some reason in the course of the write processing, then the following processing is executed.

The IC card which receives the restart command first checks the state of the status bit. At this moment, the status bit is in the on state. In that case, the IC card restores the control information from the saving region and notifies the host apparatus of a response message including the restored control information as a response to the restart command. Here, the processing status corresponding to the status bit may be transmitted to the host apparatus. The host apparatus judges that the update of the data ⑦-2 is not completed in accordance with the received response message and retransmits the data ⑦-2 update command to the IC card. Finally, the IC card updates the data ⑦-2 based on the received update command and transmits a response message to the host apparatus.

Further, if the supply of power is stopped at the position of, for example, ③ during the above-stated processing, i.e., the supply of power (to the contact IC card) or the supply of radio wave (to the non-contact IC card) is stopped for some reason after the completion of the write processing, then the following processing is executed.

The IC card which receives the restart command first checks the state of the status bit. At this moment, the status bit is in the off state. In this case, since the update of the control information is completed following the completion of the data ⑦-2, the IC card does not restore the control information and notifies the host apparatus of the updated control information as a response message to the restart command. The host apparatus judges that the update of the data ⑦-2 is completed based on the received response message and transmits a command for instructing the next processing to the IC card.

As explained above, in this embodiment, if the supply of power (to the contact IC card) or the supply of radio wave (to the non-contact IC card) is stopped for some reason, for example, the IC card restores/holds the control information in accordance with the point at which the supply of power was stopped. When the IC card is restarted, the host apparatus automatically transmits the restart command to the IC card and the IC card which receives the restart command transmits the control information to the host apparatus. By doing so, the host apparatus can grasp the processing state of the IC card. Thus, no contradiction in recognition occurs between the host apparatus and the IC card and it is, therefore, possible to normally restore the data and message relating to the interrupted update processing.

Figure 10:
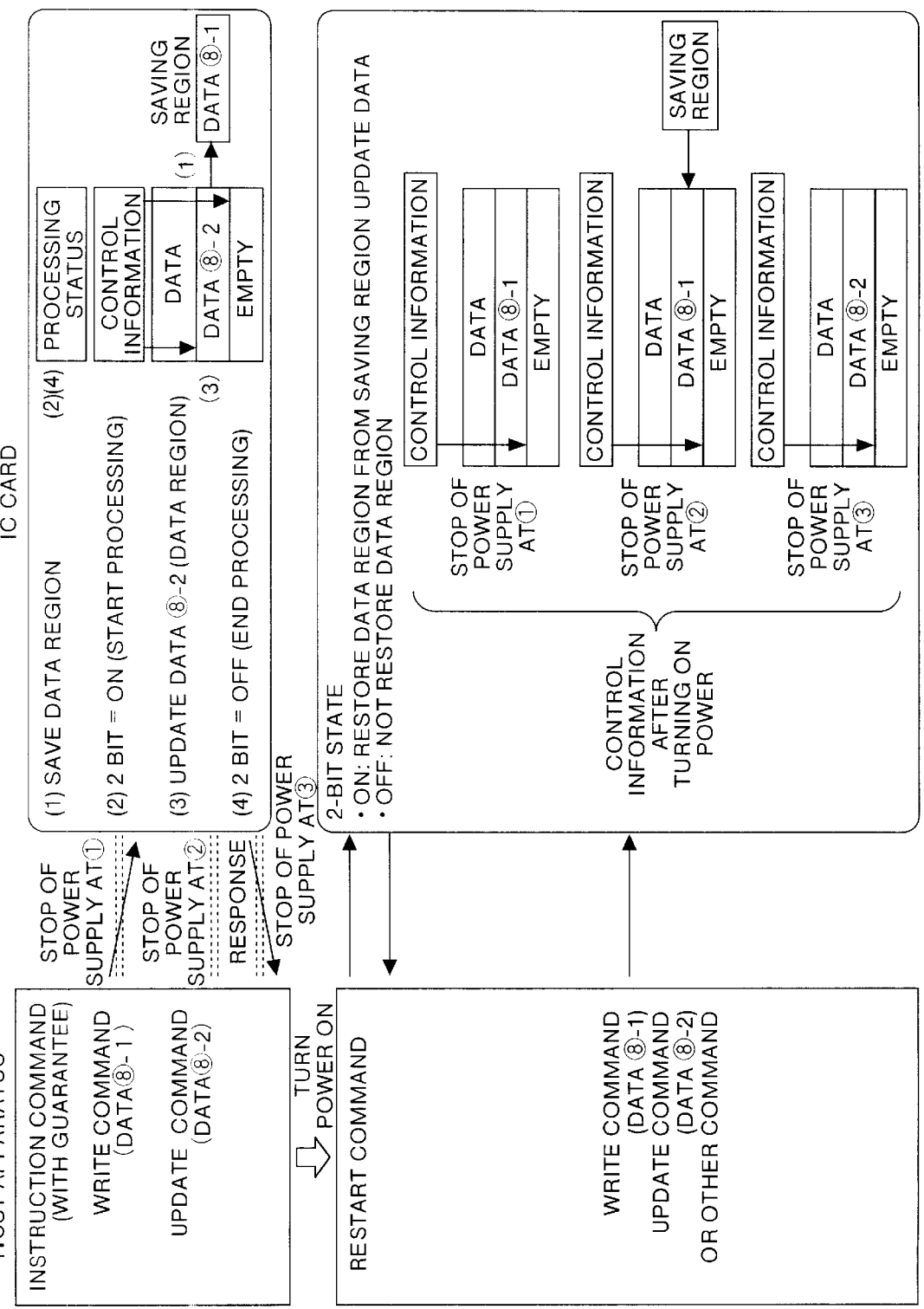
FIG. 10 shows a data restoration control method in the fifth embodiment according to the present invention.
Figure 11:
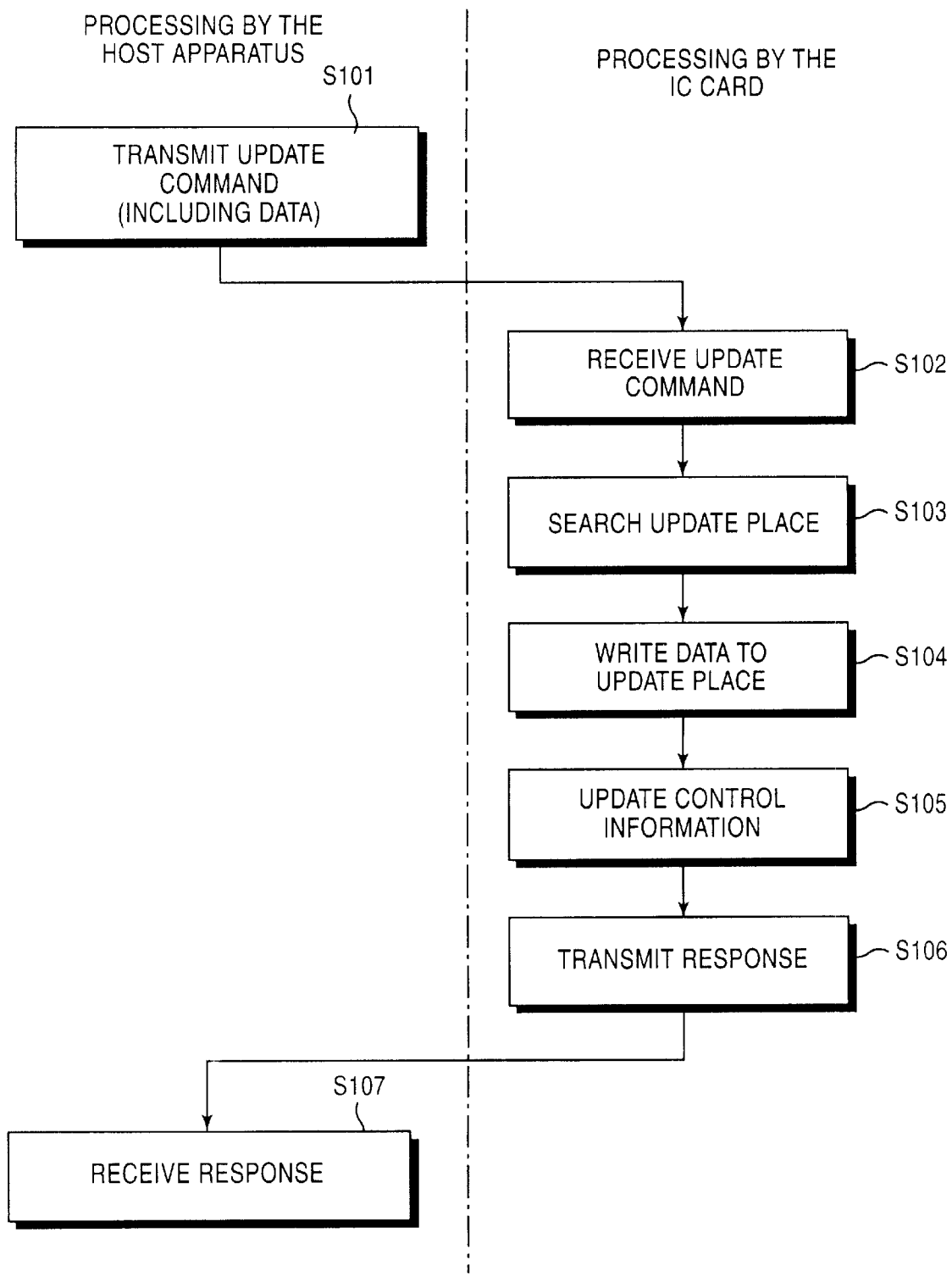
FIG. 11 is a flow chart showing the data write processing flow of a conventional IC card.
Figure 12:
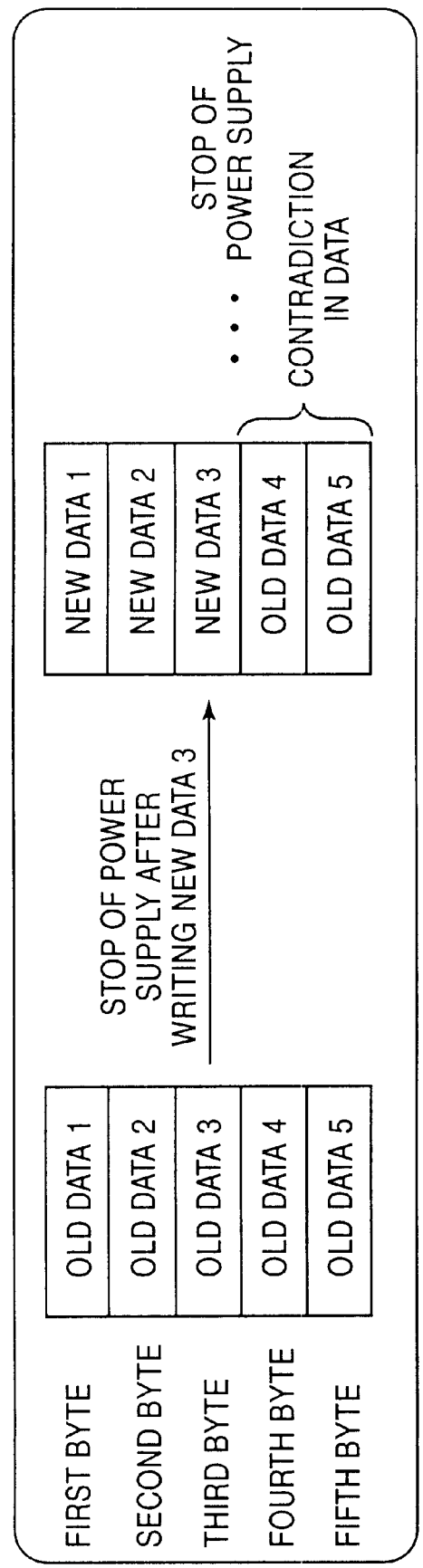
FIG. 12 shows the disadvantage if old data of five bytes stored in the IC card is updated to new data of five bytes.
Figure 13:
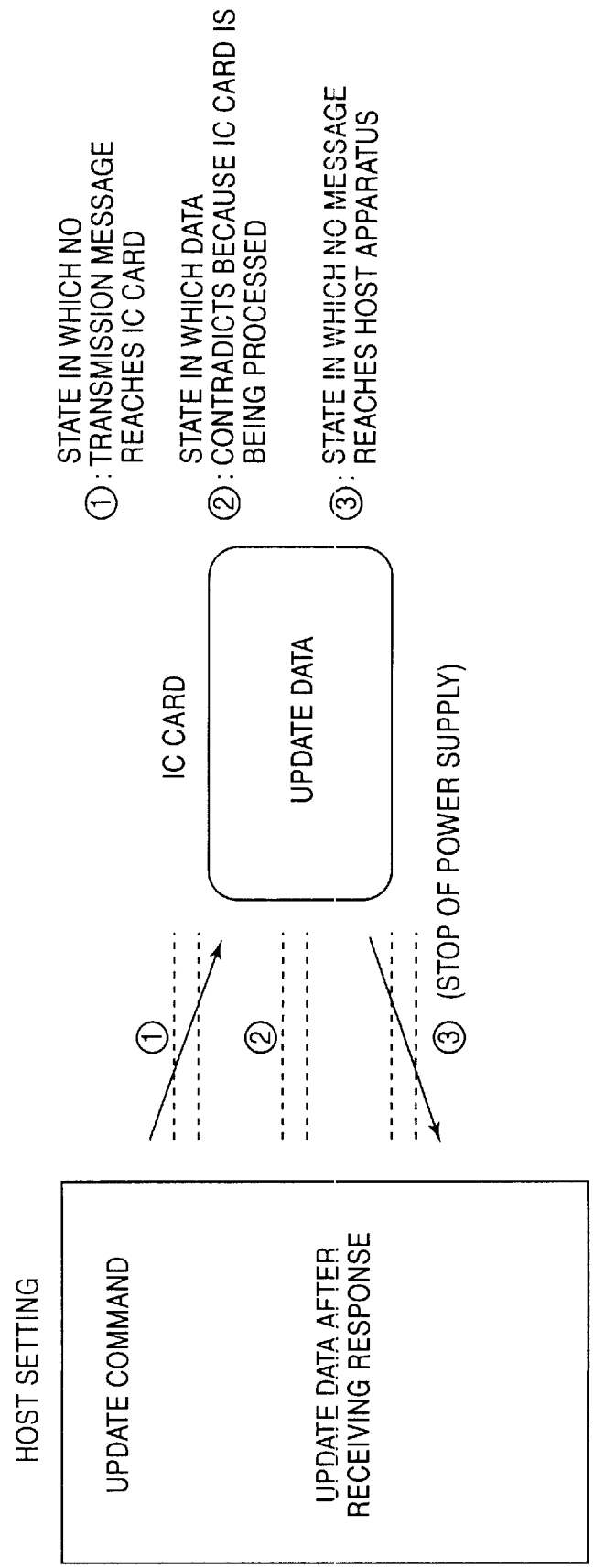
FIG. 13 shows a concrete example of the conventional disadvantage.

FIG. 10 shows a data/message restoration control method in the fifth embodiment. It is noted that "a control program" in this embodiment is stored in the ROM 2 as in the first embodiment.

In the fifth embodiment, it is assumed that a host apparatus instructs an IC card to write/update data to the data guarantee region, and the IC card restores the data region based on saving region update data when the IC card is restarted if, for example, the operation of the IC card is interrupted because of the stop of the supply of power. The meanings of command processings in this embodiment are the same as those in the fourth embodiment already stated above.

The data/message restoration control method in this embodiment will be described hereinafter. In this embodiment, it is assumed that the host apparatus transmitted an instruction command to the IC card to write data to the data guarantee region and then transmitted a write command including data ⑧-1 serving as write data in advance, and that the data ⑧-1 was already written to the IC card.

In this state, if the host apparatus transmits an update command including data ⑧-2, for example, the IC card which receives this update command first moves the content of the current data region to the saving region (corresponding to (1) in FIG. 10). Next, the IC card sets the status bit to which this processing is allotted to be in an on state indicating processing start (corresponding to (2) in FIG. 10). Thereafter, the IC card updates the data stored in the data region to the data ⑧-2 included in the update command received by the host apparatus (corresponding to (3) in FIG. 10), and sets the status bit to which this processing is allotted to be in the on state indicating processing end (corresponding to (4) in FIG. 10). Finally, the IC card transmits a response message indicating that the update processing was normally completed to the host apparatus.

If the supply of power is stopped at the position of, for example, ① during the above-stated processing, i.e., the supply of power (to the contact IC card) or the supply of radio wave (to the non-contact IC card) is stopped for some reason before the write processing, then the following processing is executed.

The IC card which receives the restart command from the host apparatus first checks the state of the status bit. At this moment, the status bit is in the off state. In this case, the IC card does not restore the data region saved in the saving region. Next, the IC card notifies the host apparatus of a response message corresponding to the data ⑧-1 as a response to the restart command. The host apparatus judges that the data ⑧-2 update processing is not completed based on the received response message and retransmits the data ⑧-2 update command to the IC card. Finally, the IC card updates the data ⑧-2 based on the received update command and then transmits a response message indicating the completion of the data update processing to the host apparatus.

Further, if the supply of power is stopped at the position of, for example, ② during the above-stated processing, i.e., the supply of power (to the contact IC card) or the supply of radio wave (to the non-contact IC card) is stopped for some reason in the course of the write processing, the following processing is executed.

The IC card which receives the restart command first checks the state of the status bit. At this moment, the status bit is in the on state. In this case, the IC card restores the data region based on the data saved in the saving region. Next, the IC card notifies the host apparatus of a response message including the restored information as a response to the restart command. The host apparatus judges that the data ⑧-2 update processing was interrupted based on the received response message and retransmits the data ⑧-2 update command to the IC card. Finally, the IC card updates the data ⑧-2 based on the received update command and then transmits a response message indicating the completion of the data update processing to the host apparatus.

Further, if the supply of power is stopped at the position of, for example, ③ during the above-stated processing, i.e., the supply of power (to the contact IC card) or the supply of radio wave (to the non-contact IC card) is stopped for some reason after the completion of the write processing, then the following processing is executed.

The IC card which receives the restart command first checks the state of the status bit. At this moment, the status bit is in the off state. In this case, the IC card does not restore the data region. Next, the IC card notifies the host apparatus of a response message corresponding to the update of the data ⑧-2 as a response to the restart command. The host apparatus judges that the data ⑧-2 update processing is not completed in the IC card based on the received response message and transmits a command for instructing the next processing to the IC card.

As explained above, in the fifth embodiment, if the supply of power (to the contact IC card) or the supply of radio wave (to the non-contact IC card) is stopped for some reason, for example, the IC card restores/holds the data region in accordance with the point at which the supply of power was stopped. When the IC card is restarted, the host apparatus automatically transmits a restart command to the IC card and the IC card which receives the restart command transmits a response message corresponding to the data region to the host apparatus. By doing so, the host apparatus can grasp the processing state of the IC card. Therefore, no contradiction in recognition occurs between the host apparatus and the IC card and the data and messages relating to the interrupted update processing can be, therefore, normally restored.

As stated so far, according to one aspect of the invention, one of "the data guarantee region" and "the data non-guarantee region" is designated using a predetermined command, thereby guaranteeing important data relating to operations between the host apparatus and the IC card. Thus, it is possible to advantageously obtain an IC card capable of normally restoring the processing executed until the operation of the IC card was stopped when restarting the IC card even if the supply of power (to the contact IC card) or the supply of radio wave (to the non-contact IC card) is stopped for some reason, for example.

According to another aspect of the invention, if the supply of power or the supply of radio wave is stopped for some reason, for example, the IC card notifies the host apparatus of "information indicating that a previous processing resulted in an error" or "information indicating that the previous processing was normally ended" when the IC card is restarted. Thus, it is possible to advantageously obtain an IC card without contradiction in recognition between the host apparatus and the IC card and capable of normally restoring the data and message relating to the processing when the IC card was interrupted if the status bit represents a normal end state.

According to still another aspect of the invention, if the supply of power or the supply of radio wave is stopped for some reason, for example, the host apparatus automatically transmits a restart command when restarting the IC card and the IC card which receives the restart command notifies the host apparatus of the processing status and the restart point information in accordance with the place where the supply of power was stopped. Thus, it is possible to advantageously obtain an IC card without contradiction in recognition between the host apparatus and the IC card ad capable of restarting the update processing at an optimum position.

According to still another aspect of the invention, if the supply of power or the supply of radio wave is stopped for some reason, for example, the host apparatus automatically transmits a restart command when the IC card is restarted and the IC card which receives the restart command restores or holds the control information in accordance with the place where the supply of power was stopped. Thus, it is possible to advantageously obtain an IC card without contradiction in recognition between the host apparatus and the IC card and capable of normally restoring the data and message relating to the interrupted update processing.

According to still another aspect of the invention, if the supply of power or the supply of radio wave is stopped for some reason, for example, the host apparatus automatically transmits the restart command when the IC card is restarted and the IC card which receives the restart command restores or holds the data region in accordance with the place where the supply of power was stopped. Thus, it is possible to advantageously obtain an IC card without contradiction in recognition between the host apparatus and the IC card and capable of normally restoring the data and message relating to the interrupted update processing.

According to still another aspect of the invention, one of "the data guarantee region" and "the data non-guarantee region" is designated using a predetermined command, thereby guaranteeing important data relating to operations between the host apparatus and the IC card. Thus, it is possible to advantageously obtain a data update control method capable of normally restoring the processing executed until the operation of the IC card was stopped when restarting the IC card even if the supply of power or the supply of radio wave is stopped for some reason, for example.

According to still another aspect of the invention, if the supply of power or the supply of radio wave is stopped for some reason, for example, the IC card notifies the host apparatus of "information indicating that a previous processing resulted in an error" or "information indicating that the previous processing was normally ended" when the IC card is restarted. Thus, it is possible to advantageously obtain a data update control method without contradiction in recognition between the host apparatus and the IC card and capable of normally restoring the data and message relating to the processing when the IC card was interrupted if the status bit represents a normal end state.

According to still another aspect of the invention, if the supply of power or the supply of radio wave is stopped for some reason, for example, the host apparatus automatically transmits a restart command when restarting the IC card and the IC card which receives the restart command notifies the host apparatus of the processing status and the restart point information in accordance with the place where the supply of power was stopped. Thus, it is possible to advantageously obtain a data update control method without contradiction in recognition between the host apparatus and the IC card and capable of restarting the update processing at an optimum position.

According to still another aspect of the invention, if the supply of power or the supply of radio wave is stopped for some reason, for example, the host apparatus automatically transmits a restart command when the IC card is restarted and the IC card which receives the restart command restores or holds the control information in accordance with the place where the supply of power was stopped. Thus, it is possible to advantageously obtain a data update control method without contradiction in recognition between the host apparatus and the IC card and capable of normally restoring the data and message relating to the interrupted update processing.

According to still another aspect of the invention, if the supply of power or the supply of radio wave is stopped for some reason, for example, the host apparatus automatically transmits the restart command when the IC card is restarted and the IC card which receives the restart command restores or holds the data region in accordance with the place where the supply of power was stopped. Thus, it is possible to advantageously obtain a data update control method without contradiction in recognition between the host apparatus and the IC card and capable of normally restoring the data and message relating to the interrupted update processing.

According to still another aspect of the invention, if the supply of power or the supply of radio wave is stopped for some reason, for example, the IC card notifies the host apparatus of "information indicating that a previous processing resulted in an error" or "information indicating that the previous processing was normally ended" when the IC card is restarted. Thus, it is possible to advantageously obtain a data/restoration control method without contradiction in recognition between the host apparatus and the IC card and capable of normally restoring the data and message relating to the processing when the IC card was interrupted if the status bit represents a normal end state.

According to still another aspect of the invention, if the supply of power or the supply of radio wave is stopped for some reason, for example, the host apparatus automatically transmits a restart command when restarting the IC card and the IC card which receives the restart command notifies the host apparatus of the processing status and the restart point information in accordance with the place where the supply of power was stopped. Thus, it is possible to advantageously obtain a data/message restoration control method without contradiction in recognition between the host apparatus and the IC card and capable of restarting the update processing at an optimum position.

According to still another aspect of the invention, if the supply of power or the supply of radio wave is stopped for some reason, for example, the host apparatus automatically transmits a restart command when the IC card is restarted and the IC card which receives the restart command restores or holds the control information in accordance with the place where the supply of power was stopped. Thus, it is possible to advantageously obtain a data/message restoration control method without contradiction in recognition between the host apparatus and the IC card and capable of normally restoring the data and message relating to the interrupted update processing.

According to still another aspect of the invention, if the supply of power or the supply of radio wave is stopped for some reason, for example, the host apparatus automatically transmits the restart command when the IC card is restarted and the IC card which receives the restart command restores or holds the data region in accordance with the place where the supply of power was stopped. Thus, it is possible to advantageously obtain a data/message restoration control method without contradiction in recognition between the host apparatus and the IC card and capable of normally restoring the data and message relating to the interrupted update processing.

According to still another aspect of the invention, if the supply of power or the supply of radio wave is stopped for some reason, for example, the IC card notifies the host apparatus of "information indicating that a previous processing resulted in an error" or "information indicating that the previous processing was normally ended" when the IC card is restarted. Thus, it is possible to advantageously obtain a control program without contradiction in recognition occurs between the host apparatus and the IC card and capable of normally restoring the data and message relating to the processing when the IC card was interrupted if the status bit represents a normal end state.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An IC card comprising:
   a first storage region in which written data is not guaranteed;
   a second storage region in which the written data is guaranteed;
   a third storage region in which a status bit indicating a processing state is stored; and
   a processing section, wherein
      if receiving a first command to write the data without guarantee from a host apparatus, said processing section sets the status bit corresponding to a write processing at a state indicating a non-guarantee write processing and writes the received data to said first storage region, and
      if receiving a second command to write data with guarantee from the host apparatus, said processing section sets the status bit corresponding to the write processing at a state indicating a guarantee write processing and writes the received data to said second storage region.

2. An IC card comprising:
   a data storage region;
   a control information storage region;
   a status bit storage region storing a status bit indicating a processing state; and
   a processing section, wherein
      if receiving a command to write data from a host apparatus, said processing section sets the status bit corresponding to a write processing at a processing start state, sets said status bit at a processing end state after finishing writing the data based on said control information, and transmits a response message indicating that the write processing was normally ended to the host apparatus; and in restarting the IC card after said write processing is interrupted, said processing section transmits an error signal to the host apparatus if said status bit is set at the processing start state, and transmits the response message indicating processing end to the host apparatus if said status bit is set at the processing end state.

3. An IC card comprising:

a data storage region;

a restart point storage region storing restart point information indicating a position at which a processing is to be restarted;

a saving region temporarily saving the restart point;

a status bit storage region storing a status bit indicating a processing state; and a processing section, wherein if receiving a command to write data from a host apparatus, said processing section moves the restart point information stored in said restart point storage region to said saving region, and writes a command serial number included in the command to said restart point storage region as restart point information, sets said status bit at a processing end state after completion of writing the data, and transmits a response message indicating that the processing was normally ended to the host apparatus; and in restarting the IC card after said write processing is interrupted, the processing section notifies the host apparatus of said status bit and the restart point processing in accordance with the state of said status bit as a response message.

4. An IC card comprising:

a data storage region; a control information storage region; a saving region temporarily saving control information; and a processing region, wherein if receiving a command to write data from a host apparatus, said processing section moves the control information stored in said control information storage region to said saving region, sets a status bit corresponding to a write processing at a processing start state, searches a data update place from said control information, stores write data included in said command in said searched update place, updates the update place for the data stored as said control information to a next data region, sets said status bit at a processing end state, and transmits a response message indicating that the processing was normally ended to said host apparatus; and in restarting the IC card after said write processing is interrupted, said processing section judges whether to restore the control information transmitted to said host apparatus in accordance with the state of said status bit.

5. An IC card comprising:

a data storage region;

a saving region temporarily saving data from a host apparatus;

a status bit storage region storing a status bit indicating a processing state; and a processing section, wherein if receiving a command to write the data from the host apparatus, said processing section moves the data stored in said data storage region to said saving region, sets the status bit corresponding to a write processing at a processing start state, writes data included in said command to said data storage region, sets said status bit at a processing end state, and transmits a response message indicating that the processing was normally ended to said host apparatus; and in restarting the IC card after said write processing is interrupted, said processing section judges whether to restore said data region in accordance with the state of said status bit.

6. A data update control method comprising:

a first write step of, if receiving a first command to write data without guarantee from externally, setting the status bit corresponding to a write processing at a state indicating a non-guarantee write processing and writing the received data to a data non-guarantee storage region; and a second write step of, if receiving a second command to write data with guarantee from externally, setting the status bit corresponding to the write processing at a state indicating a guarantee write processing and writing the received data to a data guarantee region.

7. A data update control method comprising:

a first status setting step of, if receiving a command to write data from a host apparatus, setting a status bit corresponding to a write processing at a processing start state;

a second status setting step of setting said status bit at a processing end state after finishing writing the data based on control information;

a response transmission step of transmitting a response message indicating that the write processing was normally ended to externally; and a restart step of, in restarting after said write processing is interrupted, transmitting an error signal to the host apparatus if said status bit is set at the processing start state, and transmitting the response message indicating processing end to externally if said status bit is set at the processing end state.

8. A data update control method comprising:

a saving step of, if receiving a command to write data from externally, moving restart point information to a saving region;

a first status setting step of setting a status bit corresponding to a write processing at a processing start state;

a restart point setting step of updating current restart point information to a command serial number included in said command;

a data write step of wiring the data included in said command to a predetermined data storage region;

a second status setting step of setting said status bit at a processing end state after ending writing the data;

a response transmission step of transmitting a response message indicating that the processing was normally ended to externally; and a restart step of, in restarting after said write processing is interrupted, notifying said status bit and restart point processed in accordance with the state of said status bit as the response message.

9. A data update control method comprising:

a saving step of, if receiving a command to write data from externally, moving present control information to a saving region;

a first status setting step of setting a status bit corresponding to a write processing at a processing start state;

a search step of searching a data update place from said control information;

a data storage step of storing write data included in said command in said searched update place;

a control information update step of updating the update place for the data stored as control information to a next data region;

a second status setting step of setting said status bit at a processing end state;

a response setting step of transmitting a response message indicating that the processing was normally ended to externally; and a restart step of, in restarting after said write processing is interrupted, judging whether to restore the control information transmitted to externally in accordance with the state of said status bit.

10. A data update control method comprising:

a saving step of, if receiving a command to write data from externally, moving data stored in a data storage region to a saving region;

a first status setting step of setting a status bit corresponding to a write processing at a processing start state;

a data write step of writing data included in said command to a data storage region;

a second status setting step of setting said status bit at a processing end state;

a response transmission step of transmitting a response message indicating that the processing was normally ended to externally; and a restart step of, in restarting after said write processing is interrupted, judging whether to restore said data region in accordance with the state of said status bit.

11. A data/message restoration control method comprising:

a first command transmission step in which a host apparatus transmits a command to write data;

a first status setting step in which an IC card sets a status bit corresponding to a write processing at a processing start state based on the received command;

a second status setting step in which the IC card sets said status bit at a processing end state after finishing writing the data based on said control information;

a response transmission step in which the IC card transmits a response message indicating that the processing was normally ended to said host apparatus;

a second command transmission step in which said host apparatus retransmits the command to write data if said write processing is interrupted and said host apparatus receives no response from said IC card; and a data/message restoration step in which said IC card receives the retransmitted command, prohibits the write processing and transmits an error signal to said host apparatus if said status bit is set at the processing start state, and transmits the response message to said host apparatus after restoring the data and the response message indicating the processing end by means of a rewrite processing if the status bit is set at the processing end state.

12. A data/message restoration control method comprising:

a first command transmission step in which a host apparatus transmits a command to write data;

a saving step in which an IC card moves restart point information to a saving region based on the received command;

a first status setting step of setting a status bit corresponding to a write processing at a processing start state;

a restart point setting step of updating the present restart point information to a command serial number included in said command;

a data write step of writing data included in said command to a predetermined data storage region;

a second status setting step of setting said status bit at a processing end state after ending writing the data;

a response transmission step of transmitting a response message indicating that the processing was normally ended, to said host apparatus;

a restart command transmission step in which said host apparatus transmits a restart command when restarting the IC card if said write processing is interrupted and the host apparatus receives no response;

a restart point transmission step in which said IC card notifies said host apparatus of said status bit and a restart point processed in accordance with the state of said status bit as the response message;

a second command transmission step in which said host apparatus transmits a data write command corresponding to the received restart point; and a data/message restoration step in which said IC card receives said command and restores the data and the response message indicating processing end by means of a rewrite processing.

13. A data/message restoration control method comprising:

a first command transmission step in which a host apparatus transmits a command to write data;

a saving step in which an IC card moves present control information to a saving region based on the received command;

a first status setting step of setting a status bit corresponding to a write processing at a processing start state;

a search step of searching a data update place from said control information;

a data storage step of storing write data included in said command, in said searched update place;

a control information update step of updating the update place for the data stored as the control information to a next data region;

a second status setting step of setting said status bit at a processing end state;

a response setting step of transmitting a response message indicating that the processing was normally ended to said host apparatus;

a restart command transmission step in which said host apparatus transmits a restart command when the IC card is restarted if said write processing step is interrupted and the host apparatus receives no response from said IC card;

a judgment result transmission step in which said IC card judges whether to restore the control information transmitted to said host apparatus in accordance with the state of said status bit after receiving said restart command, and transmitting a judgment result to the host apparatus as the response message;

a second command transmission step in which said host apparatus transmits a data write command corresponding to the received judgment result; and a data/message restoration step in which said IC card receives said command and restores the data and the response message indicating processing end by means of a rewrite processing.

14. A data/message restoration control method comprising:
- a first command transmission step in which a host apparatus transmits a data write command;
- a saving state in which an IC card moves data stored in a data storage region to a saving region based on the received command;
- a first status setting step in which the IC card sets a status bit corresponding to a write processing at a processing start state;
- a data write step in which the IC card writes data included in said command to the data storage region;
- a second status setting step in which the IC card sets said status bit at a processing end state;
- a response transmission step in which the IC card transmits a response message indicating a processing was normally ended to said host apparatus;
- in restarting if sad write processing is interrupted and said host apparatus receives no response from said IC card,
- a restart command transmission step in which said host apparatus transmits a restart command;
- a judgment result transmission step in which said IC card judges whether to restore said data region in accordance with a state of said status bit after receiving said restart command, and transmits a judgment result to the host apparatus as the response message;
- a second update command transmission step in which said host apparatus transmits the data write command corresponding to the received judgment result; and
- a data/message restoration step in which said IC card receives said command and restores the data and the response message indicating processing end by means of a rewrite processing.

15. A computer readable medium for storing instructions, which when executed on a computer, causes the computer to perform:
- a first status setting step of, if receiving a command to write data from externally, setting a status bit corresponding to a write processing at a processing start state;
- a second status setting step of setting said status bit at a processing end state after ending writing the data based on said control information;
- a response transmission step of transmitting a response message indicating that a processing was normally ended to externally; and
- a restart step of prohibiting the write processing and transmitting an error signal to externally if said status bit is set at the processing start state in restarting if said write processing is interrupted, and transmitting the response message indicating processing end to externally after completing a rewrite processing if said status bit is set at the processing end state.

* * * * *